United States Patent
Kanamanapalli et al.

(10) Patent No.: US 11,983,528 B2
(45) Date of Patent: May 14, 2024

(54) SYSTEM AND METHOD FOR AUTOMATED SIMULATION OF RELEASES IN AGILE ENVIRONMENTS

(71) Applicant: Infosys Limited, Bangalore (IN)

(72) Inventors: Venkatachaliah Babu Kanamanapalli, Bangalore (IN); Harish Koteshwar Narayan, Bangalore (IN)

(73) Assignee: INFOSYS LIMITED, Bangalore (IN)

( * ) Notice: Subject to any disclaimer, the term of this patent is extended or adjusted under 35 U.S.C. 154(b) by 176 days.

(21) Appl. No.: 17/394,167

(22) Filed: Aug. 4, 2021

(65) Prior Publication Data

US 2022/0261243 A1 Aug. 18, 2022

(51) Int. Cl.
  *G06F 8/77* (2018.01)
  *G06F 8/41* (2018.01)
  *G06F 8/60* (2018.01)

(52) U.S. Cl.
  CPC .......... *G06F 8/77* (2013.01); *G06F 8/433* (2013.01); *G06F 8/60* (2013.01)

(58) Field of Classification Search
  CPC ................................................. G06F 8/77
  USPC .......................................... 717/101
  See application file for complete search history.

(56) References Cited

U.S. PATENT DOCUMENTS

| | | | | |
|---|---|---|---|---|
| 8,370,803 B1 * | 2/2013 | Holler | ............... | G06F 8/36 717/107 |
| 8,566,779 B2 | 10/2013 | Sukhenko et al. | | |
| 8,813,040 B2 * | 8/2014 | Holler | ............... | G06F 8/71 717/131 |
| 9,043,745 B1 * | 5/2015 | Diskin | ............... | G06Q 10/0639 717/102 |
| 9,129,240 B2 | 9/2015 | Holler et al. | | |

(Continued)

FOREIGN PATENT DOCUMENTS

| | | |
|---|---|---|
| AU | 2018264121 A1 | 6/2019 |
| AU | 2018202129 A1 | 8/2019 |

(Continued)

OTHER PUBLICATIONS

M. I. Lunesu, R. Tonelli, L. Marchesi and M. Marchesi, "Assessing the Risk of Software Development in Agile Methodologies Using Simulation," in IEEE Access, vol. 9, pp. 134240-134258, 2021, doi: 10.1109/Access.2021.3115941.*

(Continued)

*Primary Examiner* — Francisco J Aponte
(74) *Attorney, Agent, or Firm* — Troutman Pepper Hamilton Sanders LLP (Rochester)

(57) ABSTRACT

A method and/or system for automated simulation of releases in Agile environments is disclosed. The system is an automated simulation engine comprising—release simulation engine to perform simulate at program or release level and sprint simulation engine to perform simulation at sprint level. The system enables user to simulate execution pattern of user stories, identify spillover user stories and risks in the execution pattern simulated by the system and re-run the simulation iteratively by modifying various project related parameters to arrive at an optimal release plan for projects in Agile environment before the actual allocation to project teams, thereby foreseeing the possible risks and mitigating them for efficient project delivery.

18 Claims, 15 Drawing Sheets

(56) References Cited

U.S. PATENT DOCUMENTS

| | | |
|---|---|---|
| 9,135,590 B1 | 9/2015 | Liu |
| 9,501,751 B1 | 11/2016 | Holler et al. |
| 9,619,208 B2 | 4/2017 | Davidov et al. |
| 9,690,461 B2 | 6/2017 | Holler et al. |
| 9,858,069 B2 | 1/2018 | Holler et al. |
| 10,049,337 B2* | 8/2018 | Mack ............... G06Q 10/067 |
| 10,083,412 B2* | 9/2018 | Suntinger ........ G06Q 10/06314 |
| 10,248,387 B2* | 4/2019 | Bharthulwar ............. G06F 8/77 |
| 10,332,073 B2* | 6/2019 | Abebe ............... G06Q 10/103 |
| 10,372,421 B2* | 8/2019 | Mack ..................... G06F 8/20 |
| 10,452,521 B2* | 10/2019 | Kaulgud ............. G06F 11/3684 |
| 10,540,573 B1* | 1/2020 | Li ......................... G06F 18/217 |
| 10,642,611 B2* | 5/2020 | Bhattacharyya ....... G06Q 10/06 |
| 11,093,227 B1* | 8/2021 | Shteyman ............... H04L 67/34 |
| 11,409,507 B1* | 8/2022 | Shepherd ................. G06F 8/10 |
| 11,474,864 B2* | 10/2022 | Qiao ....................... H04L 67/34 |
| 2011/0289474 A1 | 11/2011 | Sukhenko et al. |
| 2012/0079449 A1 | 3/2012 | Sanderson et al. |
| 2014/0053127 A1* | 2/2014 | Madison ................... G06F 8/30 717/103 |
| 2014/0359555 A1* | 12/2014 | Holler ...................... G06F 8/71 717/101 |
| 2015/0234801 A1* | 8/2015 | Michaels ............ G06F 3/04842 715/733 |
| 2016/0077832 A1* | 3/2016 | Bhattacharyya ....... G06Q 10/06 717/101 |
| 2016/0364210 A1* | 12/2016 | Davidov ................... G06F 8/20 |
| 2017/0061348 A1* | 3/2017 | Mack ............... G06Q 10/06313 |
| 2018/0046455 A1* | 2/2018 | Walsh ..................... G06F 16/22 |
| 2018/0060785 A1* | 3/2018 | Carnevale ........ G06Q 10/06313 |
| 2018/0068271 A1* | 3/2018 | Abebe ................. G06Q 10/103 |
| 2018/0075412 A1* | 3/2018 | Mandava ............. G06Q 10/101 |
| 2018/0321935 A1* | 11/2018 | Bansal ................. G06F 3/04842 |
| 2018/0349135 A1* | 12/2018 | Burns ....................... G06F 8/77 |
| 2018/0365628 A1* | 12/2018 | Bhaskaran ..... G06Q 10/063112 |
| 2019/0050771 A1* | 2/2019 | Meharwade ......... G06Q 10/067 |
| 2019/0122153 A1* | 4/2019 | Meharwade ..... G06Q 10/06313 |
| 2019/0243644 A1* | 8/2019 | Jose ......................... G06F 8/60 |
| 2019/0278592 A1 | 9/2019 | Bansal et al. |
| 2020/0159525 A1* | 5/2020 | Bhalla .............. G06Q 10/06313 |
| 2020/0159950 A1* | 5/2020 | Bodin .................. G06Q 10/101 |
| 2020/0210934 A1* | 7/2020 | Bar-On .......... G06Q 10/063114 |
| 2020/0272554 A1* | 8/2020 | Sneed ................. G06F 11/3692 |
| 2021/0117907 A1* | 4/2021 | Gray ............. G06Q 10/063118 |
| 2021/0157715 A1* | 5/2021 | Hand .............. G06Q 10/06313 |
| 2022/0006706 A1* | 1/2022 | Patodia ............... H04L 41/5019 |
| 2022/0334837 A1* | 10/2022 | Sa ............................. G06F 8/20 |
| 2022/0335023 A1* | 10/2022 | Knox ....................... G06F 8/77 |
| 2023/0274207 A1* | 8/2023 | Uzan ................ G06Q 10/06312 705/7.15 |

FOREIGN PATENT DOCUMENTS

| | | |
|---|---|---|
| CN | 106354521 A | 1/2017 |
| CN | 108345988 A | 7/2018 |
| KR | 101381231 B1 | 4/2014 |

OTHER PUBLICATIONS

Nurfauza Jali et al. "The Adoption of Agile Software Methodology with Team Software Process (TSPI) Practices in the Software Engineering Undergraduate Course"; Journal of IT in Asia, vol. 7, 2017, 1-8.*

Maria Ilaria Lunesu et al. "Assessing the Risk of Software Development in Agile Methodologies Using Simulation"; Digital Object Identifier 10.1109/Access.2021.3115941—Sep. 27, 2021.*

Project Launch—Agile Analytics for JIRA, Northcraft Analytics, https://youtu.be/ZtgPmUszi2U, Oct. 16, 2019.

Gravitate Solutions, Agile Analytics, "https://gravitatesolutions.com/services/business-intelligence/agile-analytics/", Aug. 11, 2016.

* cited by examiner

RISK ASSESSMENT MODULE

SPRINT SEQUENCING MODULE

FIGURE 9

SYSTEM AND METHOD FOR AUTOMATED SIMULATION OF RELEASES IN AGILE ENVIRONMENTS

This application claims the benefit of Indian Patent Application Serial No. 202141006586 filed Feb. 17, 2021, which is hereby incorporated by reference in its entirety.

FIELD

The present technique generally relates to field of project management in Agile Environments. More specifically, the technique relates to automated simulation platform for project releases in Agile Environments.

BACKGROUND

In a software service industry, Agile methodology is a way of project management that focuses on iterative and incremental development of final deliverables. The goal of Agile is to produce results in a repeatable and continuous manner. Agile offers an extremely flexible and less rigid approach for development of software and is the reason why it is more preferred than waterfall model. Predictability in delivering committed output/result consistently over increments is a key targeted benefit of adopting Agile delivery methodology. Agile delivery adopting scrum methodology has become order of the day.

Teams working in the Agile Environment would be well-aware of the both the advantages and challenges that are faced as they go through the process of software delivery in such environments. Delivering enterprise scale systems call for the need to scale agility to large team environments. Agility in large team environments to deliver commitments predictably is faced with many challenges such as managing inter-dependencies, integrated planning, and alignment to the value to be offered. The present disclosure intends to solve such challenges to enhance effectiveness of delivery in Agile Environment.

SUMMARY

In large Agile projects, right from planning releases across multiple teams and sprints with inter-dependencies between teams, followed by sprint planning within each of the teams, managing inter-dependencies across teams and/or sprints during sprint planning and executing sprints as well as improving performance through retrospection from each of the sprint executions is key to a successful Agile delivery. This assumes increased significance given that team members may be dispersed i.e., each team member having to work from different geographical locations which may be challenging to manage large teams and ensure timely completion of deliverables.

Presently, management of sprint delivery in Agile is enabled by Agile Lifecycle Management (ALM) tools. The ALM tools enable monitoring the progress of stories based on workflow configured for the projects. Scrum boards reflect the status of the user stories based on the workflow configured and track the progress of user stories accordingly. However, the large agile teams often struggle due to lack of tools which enable robust planning and simulation capabilities. Presently, there are no solutions available to provide functionality to view risks of the release plan in terms of bottleneck teams, capacity constraints, dependency risks and priorities of user stories related to release plan in progress and to adjust release plan accordingly.

The technology described in the present disclosure overcomes the above mentioned problem through system and/or method for automated simulation of releases in agile environments, which provides ability to perform effective release planning at the sprint level as well as releases involving large dispersed teams. Through the automated simulation engine of the present disclosure, the Agile teams will be able to plan the releases and sprints better, manage inter-dependencies, simulate what-if scenarios, provide early warning signals to help make decision in project delivery, collaborate between teams in a significantly better way and gain better understanding of cause-effect relationship overall delivery predictability of large agile programs in a dispersed team context.

Disclosed are a system, a method and/or non-transitory computer readable storage medium for automated simulation of releases in Agile environments.

In one aspect, a computer implemented method for automated simulation of releases in Agile environments is disclosed. The method comprising, receiving a project data from a database which comprises resource information and a set of features comprising user stories. An order of execution of user stories across plurality of sprints and teams is determined dynamically based on the received project data.

The steps for determining order of execution of user stories comprises identifying priority of completion of user stories, dependencies between the user stories within each sprint of the plurality of sprints and teams, and dependencies between the user stories across the plurality of sprints and teams. A start date for the user stories may be determined based on at least one of, but not limited to number of work-in-progress stories, team size, the identified priority, and/or dependencies. An end date may be determined based on the determined start date and size of the user stories. The order of execution of user stories is determined based on the determined start date and the end date for the user stories.

The determined order of execution of user stories comprising one or more patterns of allocation of the user stories to the plurality of sprints and teams is displayed graphically along with the risks present in the determined order of execution and allocation of user stories. The risks may be at least one of invalid dependencies or potential spillover of user stories. The invalid dependencies may be at least one or combination of invalid dependencies between teams and invalid dependencies between user stories across sprints (i.e. one or more stories of a sprint may be dependent on one or more stories of subsequent sprint which is considered as invalid dependency). The potential spillover of user stories is said to be present if the determined order of execution of user stories surpasses the scheduled timeline. An update to the project data is received from a user to resolve risks and to revise the order of execution of the user stores. The revised order of execution of user stories is displayed graphically at the user device comprising one or more patterns of allocation of the user stories to the plurality of sprints and teams. The user may choose to either re-run the simulation or proceed with the revised order of execution of user stories as determined by the automated simulation method.

In another aspect, a system for automated simulation of releases in Agile environments is disclosed. The system comprising one or more components, but not limited to a sprint planning module, a sequencing module, a load balancing module, and a re-planning module. The sprint planning module is configured to determined order of execution of user stories within a sprint by identifying priority of completion of user stories, dependencies between the user stories within each sprint of the plurality of sprints, and dependencies between the user stories across the plurality of sprints and teams. A start date for the user stories may be determined based on at least one of, but not limited to number of work-in-progress stories, team size, the identified priority, and/or dependencies. An end date may be determined based on the determined start date and size of the user stories. The order of execution of user stories is determined based on the determined start date and the end date for the user stories and is displayed graphically at a computing device associated with the user.

The sequencing module is configured to determined possible allocation of user stories to plurality of sprints and teams and determining order of execution of user stories across plurality of sprints and teams. The load balancing module is configured to determine risk present in the order of execution of user stories determined by the sequencing module and display the determined risks graphically at the computing device associated with the user. The risks may be at least one of invalid dependencies or potential spillover of user stories. The invalid dependencies may be at least one or combination of invalid dependencies between teams and invalid dependencies between user stories across sprints. The re-planning module is configured to receive updated project data from a user and revise the order of execution of user stories.

In yet another aspect, a non-transitory computer readable storage medium for automated simulation of releases in Agile environments is disclosed. The non-transitory compute readable storage medium comprising machine executable code which when executed by at least one processor, causes the at least one processor to perform steps such as, receiving a project data from a database which comprises resource information and a set of features comprising user stories. An order of execution of user stories across plurality of sprints and teams is determined dynamically based on the received project data.

The steps for determining order of execution of user stories comprises identifying priority of completion of user stories, dependencies between the user stories within each sprint of the plurality of sprints, and dependencies between the user stories across the plurality of sprints and teams. A start date for the user stories may be determined based on at least one of, but not limited to number of work-in-progress stories, team size, the identified priority, and/or dependencies. An end date may be determined based on the determined start date and size of the user stories. The order of execution of user stories is determined based on the determined start date and the end date for the user stories.

The determined order of execution of user stories comprising one or more patterns of allocation of the user stories to the plurality of sprints and teams is displayed graphically along with the risks present in the determined order of execution and allocation of user stories. The risks may be at least one of invalid dependencies or potential spillover of user stories or team capacity constraints. The invalid dependencies may be at least one or combination of invalid dependencies between teams and invalid dependencies between user stories across sprints. The potential spillover of user stories is said to be present if the determined order of execution of user stories surpasses the scheduled timeline. An update to the project data is received from a user to resolve risks and to revise the order of execution of the user stores. The revised order of execution of user stories is displayed graphically at the user device comprising one or more patterns of allocation of the user stories to the plurality of sprints. The user may choose to either re-run the simulation or proceed with the revised order of execution of user stories as determined by the automated simulation system.

The method, the system, and/or the non-transitory computer readable storage medium disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limited to the figures of the accompanying drawings, in which like references indicate similar elements and in which:

FIG. 9 is a snapshot, illustrating output generated by sequencing module of the automated simulation engine, according to one or more embodiments.

Figure 1:
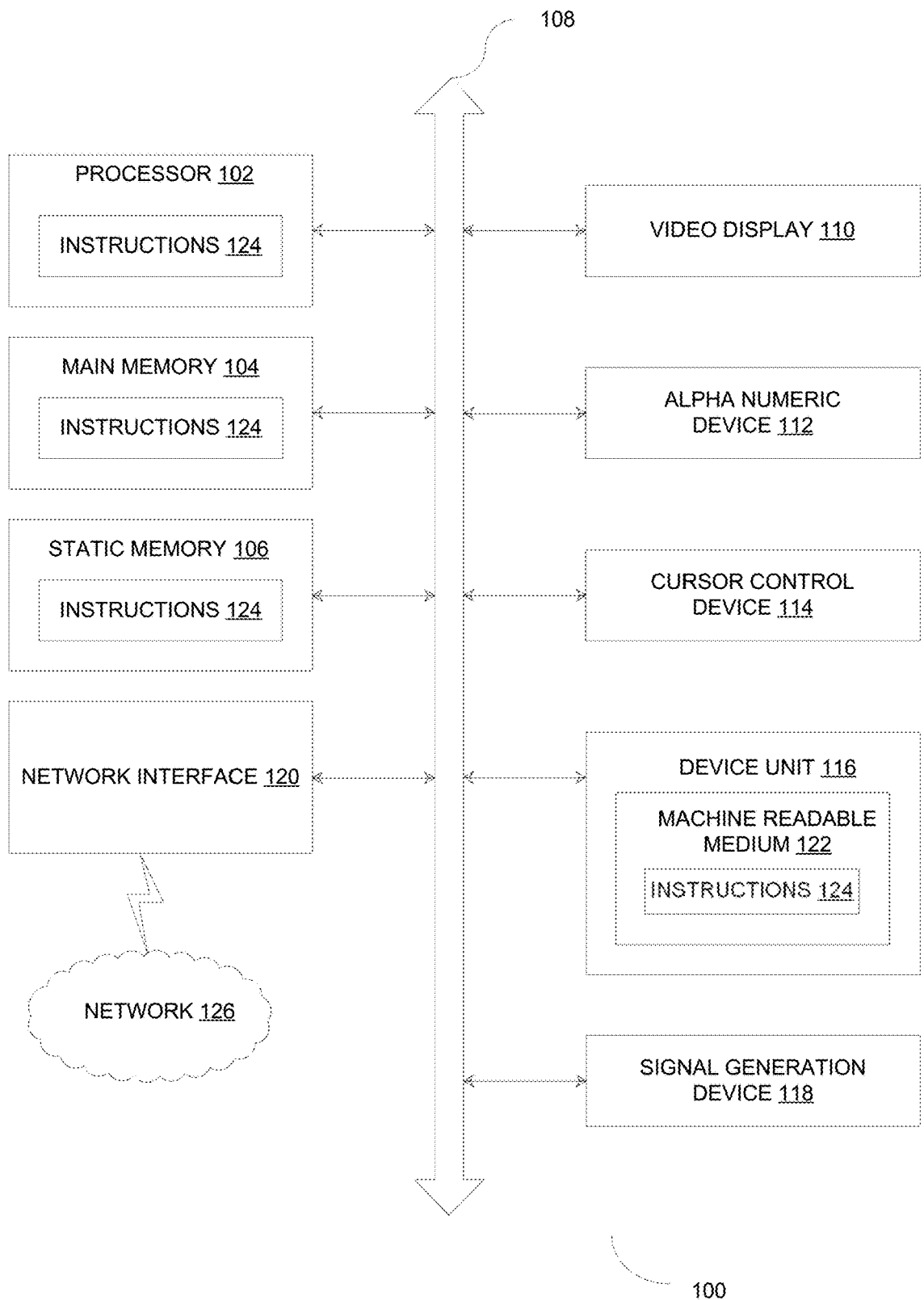
FIG. 1 is a diagrammatic representation of a data processing system capable of processing a set of instructions to perform any one or more of the methodologies herein, according to one or more embodiments.

Other features of the present embodiments will be apparent from the accompanying drawings and from the detailed description that follows.

DETAILED DESCRIPTION

The objective of invention in the present disclosure is to overcome the technical problem mentioned in the background section through a system for automated simulation of releases in Agile environments.

In an Agile environment, large projects are delivered in short increments. One of the methodologies adopted by project teams is scrum based Agile delivery. Scrum is a framework which is centered around the concept of continuous improvement that helps teams working together to deliver projects in small increments over fixed short iterations. Scrum is structured to help teams adapt to changing conditions and user requirements. Scrum may be associated with three basic artifacts—a product backlog, a release backlog, and a sprint backlog.

A product backlog is a master list of work comprising list of features, requirements which are termed as user stories—a natural language description of one or more features of a software system. Before each release, all the teams involved in the release conduct release planning, to prioritize stories in all sprints that are part of the release, identify inter-dependencies across teams and sprints. A release backlog is a collection of sprints in which one or more teams can be involved in delivering the release backlog. At the beginning of any release, the release manager along with all teams including the scrum master and product owners plan what can be accomplished at the end of the release (at the end of the release meaning completion of all the tasks in release backlog). The outcome of this planning is a release backlog with an indication on what needs to be accomplished in a prioritized manner by each team in each of the sprints that form the release along with inter-dependencies between sprints and teams. Before each sprint, each team conducts sprint planning meeting and may choose which items it will work on for the sprint from the release backlog. A sprint is a short period during which a scrum team works to complete a work item identified in the sprint backlog. Story points are units of measurement which indicates estimate of size of the product backlog item and is also a representation of the overall effort required to fully implement the product backlog item.

A release goal (also referred to as "increment") is a usable product at the end of the release. A sprint goal (also referred to as 'increment' but may be smaller compared to release goal) may be a usable end-product at the end of a sprint. A sprint is an actual time when a scrum team work together to complete an increment. The work to be performed during the current sprint is planned during a meeting by the entire development team. The meeting is led by the scrum master and is where the team decides on the sprint goal. Specific user stories are then added to the sprint from the product backlog. Scrum masters are those who facilitates the process, schedules the resources for sprint planning, stand-up, sprint review and sprint retrospective i.e. who ensures that scrum framework is followed.

Daily Scrum or Daily stand-up is a daily short meeting which intend to get a plan out for next 24 hours. Generally, the questions such as 'what did I do yesterday', 'what is planned for today' and 'are there any obstacles' are answered. Sprint review is an informal session where the team meets to view a demo, inspect, or increment. This is also to inspect product backlog which can be referred and used for next sprint planning session. Sprint retrospective is where the team comes together to document and discuss what worked and what didn't work in a sprint.

Sprint planning is an event in the scrum and the purpose is to define what can be delivered in the sprint. Release planning is a super set of sprint planning. Multiple sprint planning put together across sprints helps in planning a release of project in Agile environments.

In a distributed environment, delivering large complex projects with higher predictability using agile ways at working has always been a major challenge. With Agile team being dispersed, this challenge has increased many folds. As discussed about the shortcomings of ALM tools, the need now is to device smarter ways of working to ensure on-time product delivery. The technique in the present disclosure is an automated simulation system which is an algorithm-based planning engine configured to work on top of ALM tools. The automated simulation engine creates optimized release and sprint plan, enables what-if simulation during release and sprint planning, highlights the risks involved in release planning and sprint planning based on multiple parameters through an algorithm, de-risks sprint performance by identifying likely spillover stories, addresses dependency related risks, provides easy visualization of release and sprint plan process for agile teams dispersed across geographies and helps the scrum master to schedule the user stories thereby avoiding spillovers and maximizing sprint goals. The automated simulation engine comprises two major components—release simulation engine and sprint simulation engine.

The release simulation engine helps program team planner to plan release across multiple teams and sprints, balancing the capacity, address any dependency related risks. The release simulation engine simulates what-if scenarios by considering both demand as well as team's capacity before arriving at a good quality release plan. It enables feature driven planning to maximize value realization to end users, simulate what-if scenarios in minutes to enable decision making, simplify the release planning process based on algorithms, collaborative visualization on inter-team dependencies at story and feature level, ability of teams to present their plans with risks identified, recommendations to improve quality of the release plan, ability to recast release plan based on actual release performance which helps simulate planning decisions very quickly.

The sprint simulation engine helps better planning, improve daily team collaboration and effective retrospectives to improve agile team performance sprint after sprint. The sprint simulation engine performs algorithm guided sprint planning simulations, suggesting plans that maximize sprint goals, de-risking sprint performance by identifying likely spillover of stories within sprint, recasting sprint plan based on progress and offering pictorial view of team's performance.

In one or more embodiments, a method, system and/or computer readable storage medium for automated simulation of releases in Agile environments is disclosed. The method comprising, receiving a project data from a database which comprises resource information and a set of features comprising user stories. An order of execution of user stories across plurality of sprints may be determined dynamically based on the received project data.

The steps for determining order of execution of user stories may comprise identifying priority of completion of user stories, dependencies between the user stories within each sprint of the plurality of sprints and teams, and dependencies between the user stories across the plurality of sprints and teams. A start date for the user stories may be determined based on at least one of, but not limited to number of work-in-progress stories, team size, the identified priority, and/or dependencies. An end date may be determined based on the determined start date and size of the user stories. The order of execution of user stories may be determined based on the determined start date and the end date for the user stories.

The determined order of execution of user stories comprising one or more patterns of allocation of the user stories to the plurality of sprints and teams is displayed graphically along with the risks present in the determined order of execution and allocation of user stories. The risks may be at least one of invalid dependencies or potential spillover of user stories. The invalid dependencies may be at least one or combination of invalid dependencies between teams and invalid dependencies between user stories across sprints. The potential spillover of user stories is said to be present if the determined order of execution of user stories surpasses the scheduled timeline. An update to the project data may be received from a user to resolve risks and to revise the order of execution of the user stores. The revised order of execution of user stories may be displayed graphically at the computing device associated with the user, comprising one or more patterns of allocation of the user stories to the plurality of sprints. The user may choose to either re-run the simulation or proceed with the revised order of execution of user stories as determined by the automated simulation method.

FIG. 1 is a diagrammatic representation of a machine and/or data processing device capable of processing a set of instructions to perform any one or more of the methodologies herein, according to one embodiment. The machine and/or the data processing device in the example form, comprises a computer system 100 within which a set of instructions, for causing the machine to perform any one or more of the methodologies discussed herein, may be executed. In various embodiments, the machine operates as a standalone device and/or may be connected (e.g., networked) to other machines.

A machine may be a personal computer (PC), laptop or an embedded system and/or any machine capable of executing a set of instructions (sequential or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 100 includes a processor 102 (e.g., a central processing unit (CPU) a graphics processing unit (GPU) and/or both), a main memory 104 and a static memory 106, which communicate with each other via a bus 108. The computer system 100 may further include a video display unit 110 (e.g., a liquid crystal displays (LCD) and/or a cathode ray tube (CRT)). The computer system 100 also includes an alphanumeric input device 112 (e.g., a keyboard), a cursor control device 114 (e.g., a mouse), a disk drive unit 116, a signal generation device 118 (e.g., a speaker), and a network interface 120.

The disk drive unit 116 includes a machine-readable medium 122 on which is stored one or more sets of instructions 124 (e.g., software) embodying any one or more of the methodologies and/or functions described herein. The instructions 124 may also reside, completely and/or at least partially, within the main memory 104, within the static memory 106 and/or within the processor 102 during execution thereof by the computer system 100, the main memory 104 and the processor 102 also constituting machine-readable media.

The instructions 124 may further be transmitted and/or received over a network 126 via the network interface 120. While the machine-readable medium 122 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical media and magnetic media.

Figure 2:
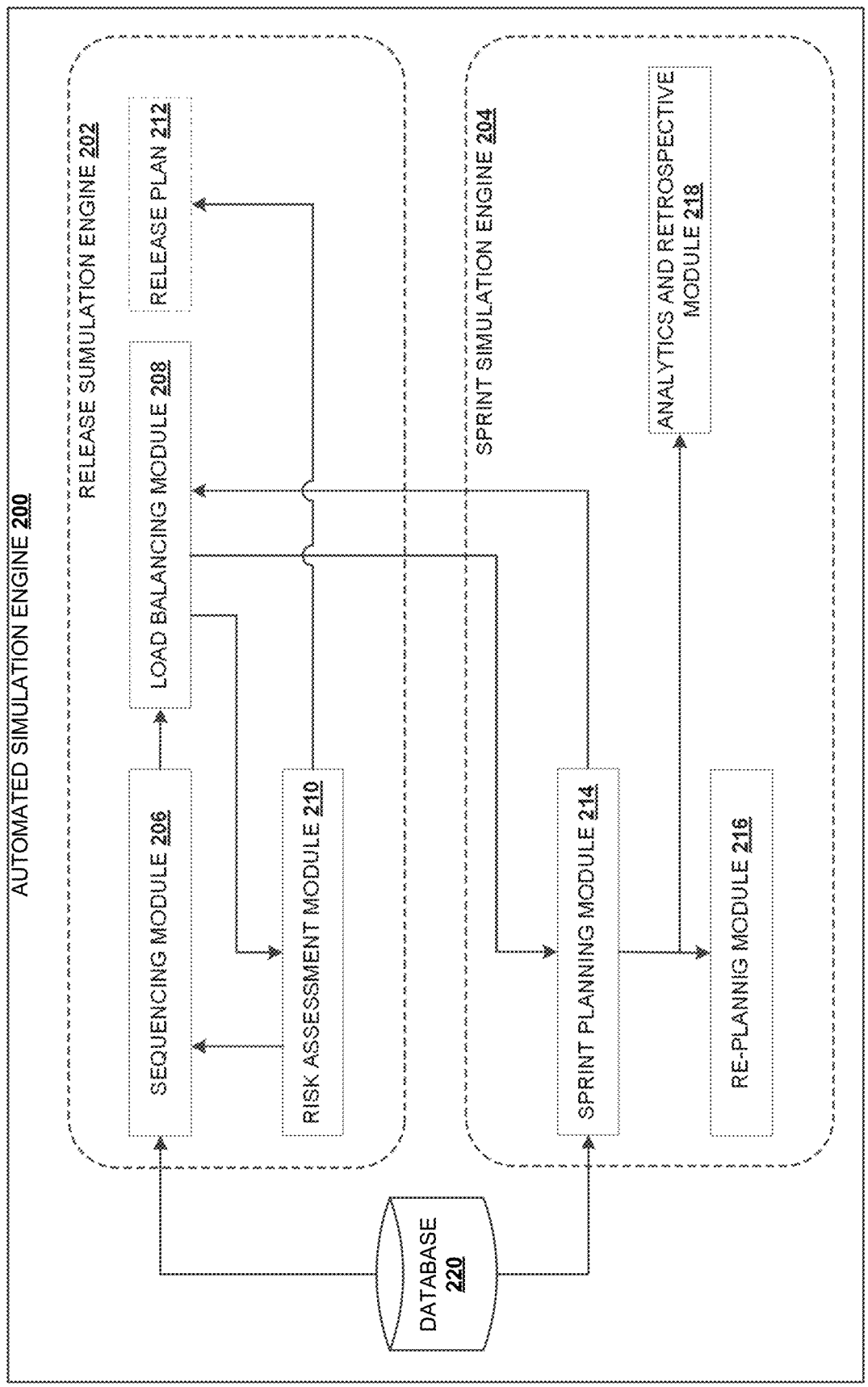
FIG. 2 is an architecture diagram illustrating a system for automated simulation of releases in Agile environment, according to one or more embodiments.

FIG. 2 is an architecture diagram illustrating a system for automated simulation of releases in Agile environments. The system also termed as simulation engine 200 may comprise plurality of components comprising, by not limited to, release simulation engine 202 and sprint simulation engine 204. The release simulation engine 202 may comprise one or more components, but not limited to, a sequencing module 206, a load balancing module 208, a risk assessment module 210 configured to generate a release plan 212. The sprint simulation engine 204 may comprise one or more components, but not limited to, a sprint planning module 214, a re-planning module 216, an analytics and retrospective module 218 and a database 220. The afore-mentioned components are configured to communicate between each other, through a processor, as described in subsequent paragraphs of the present disclosure.

Figure 3:
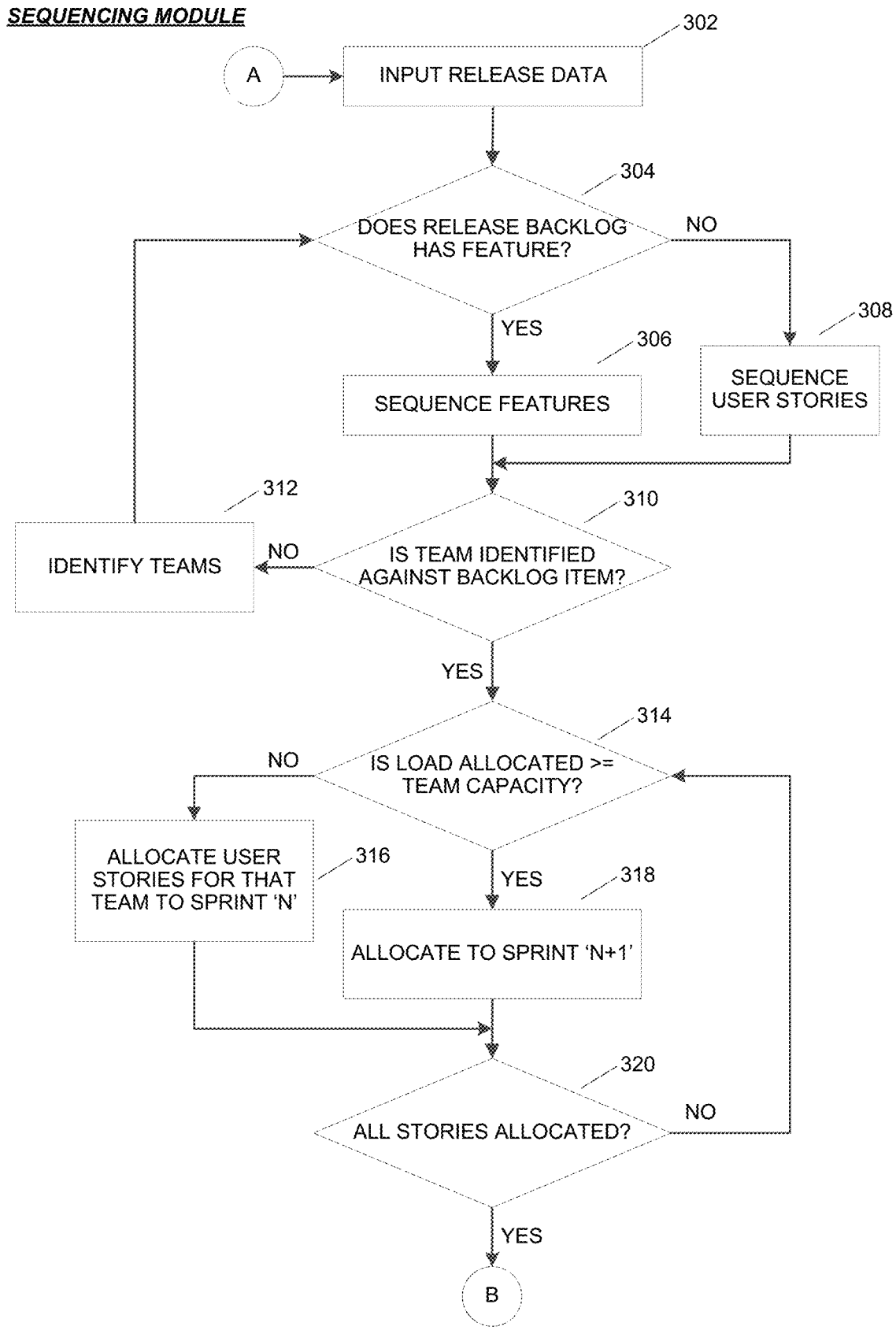
FIG. 3 is a process flow diagram, illustrating the steps performed by sequencing module of automated simulation engine, according to one or more embodiments.

Referring to FIG. 3, which is a process flow diagram, illustrating the steps performed by the sequencing module 206 of automated simulation engine 200, according to one or more embodiments. In one or more embodiments, the sequencing module 206 may be configured to communicate with the load balancing module 208. The sequencing module 206 may be configured to receive input from user such as, but not limited to, resource information and project data as in step 302. In another embodiment, the sequencing module 206 may be configured to receive the resource information and project data may from the database 220.

The resource information may comprise information such as, but not limited to, count of number of available teams, composition of team such as developers and testers, team sprint wise capacity, velocity, number of sprints and/or level of planning. The team sprint wise capacity may be calculated as number of people available in that sprint. The velocity (also referred as 'productivity') measures unit of work completed in a timeframe which is calculated as total number of completed story points and divide them by the number of completed sprints. Number of sprints may indicate time frame available for completion of assigned job. The level of planning may indicate whether the sequencing to be performed either at the feature level or the story level by the automated simulation engine 200. This information may be captured by the automated simulation engine 200 during the initial set up performed by the user, which is configurable. The initial set up may be part of delivery workflow configurations defined by the organization, which may include parameters such as, but not limited to, the number of sprints in a release, number of teams and/or projected velocity for each team in each of the sprints. The initial setup parameters can be changed by the user to simulate different what if scenarios.

The project data may comprise release backlog, which is a set of features, each feature of the set of features comprising one or more user stories (also referred as just 'stories'). The release backlog is usually a subset of product backlog. A feature may be a component of the final product that needs to be completed and a user story is the smallest unit of work in an Agile framework. A final product to be completed may be split into multiple features and each feature is split into smallest unit called user stories. There may be dependencies of user stories within each feature or across features. After identifying which user stories will go into a which release, the user stories become part of the release backlog.

A condition may be checked whether the release backlog has any features, as in step 304. In case there is only one feature with multiple user stories, an order of execution of user stories (also referred as 'sequence of user stories') may be determined for that feature based on parameters such as, but not limited to business priorities, size of user stories (in terms of story points), inter-dependencies of the user stories within the feature, as in step 308. In case where the release backlog has more than one features, an order of execution of features may be determined as in step 306. The order of execution of features may be determined based on one or more parameters such as, but not limited to, business priority, size of the feature and external dependencies of user stories i.e., story of one feature is dependent on story of another feature.

A condition may be checked to identify if the teams have been identified against the release backlog items, as in step 310. If no, then the teams may be identified, as in step 312, which may be user action wherein the use may identify teams and provide teams information as input to the sequencing module 206. If teams have been identified against the backlog item as per the step 310, a condition may be checked to identify whether load in terms of user stories or the features assigned for the teams is more than the execution capacity of the teams in terms of story points in a sprint ('N'), as in step 314. If the load allocation meets the capacity of the team or is less than the capacity of the team, the user story may be allocated to the sprint 'N' (i.e., current sprint) along with the external stories that the feature or the story that may be dependent on, as in step 316. External stories are those stories not part of feature under consideration but belong to another feature. Also, allocation as in step 316 may be performed by considering the order of execution of user stories as determined in the previous steps (306 and 308). If the load allocation to the team is more than the capacity of the team, the stories may be allocated to a next sprint (say sprint 'N+1') for the same team as in step 318 on a condition that the sprint 'N+1' is one of plurality of the sprints associated with the team for the release. A condition may be checked as in step 320 to determine whether all stories are allocated to the available teams. If yes, the instructions along with the allocation information may be sent by the sequencing module 206 to the load balancing module 208. If there are stories yet to be allocated as per the check in step 320, the steps 314, 316, 318 and 320 may be executed iteratively till all the stories are sequenced and are allocated to the teams.

Referring to FIG. 2, the load balancing module 208 may be configured to receive the allocation information from the sequencing module 206. The load balancing module 208, as illustrated in process flow diagram in FIG. 4 may be configured to determine acceptable load for the teams and potential spillover of user stories through simulation, according to one or more embodiments. The load balancing module 208 may be configured to determine at least one of, but not limited to—if there is any change in release backlog, if there any change in sprint allocation, and/or are there any new stories added as in step 402. If there is change in at least one of afore-mentioned information, the instructions may be communicated to sequencing module 206 to re-work on the allocation of user stories. If no changes in at least one of afore-mentioned information, further, team related changes are checked such as, but not limited to—changes in teams availability, selection or deselection of sprints for the release, changes in capacity of the teams, change in productivity of the teams and/or changes in velocity of the teams, as in step 404. If at least one of these changes are detected by the load balancing module 208, the instructions may be sent to the sequencing module 206 to re-run allocations. If no changes detected in step 404, a check may be performed determine whether level of planning is set as detailed level i.e. the planning to be performed at the story level within each sprint. If yes, the instructions may be communicated to sprint planning module 214 to perform sequencing at the sprint level. If no user input is detected for changing the allocation information received from the sequencing module 206, the load balancing module 208 may be configured to determine potential spillovers and highlight issues (risks) in the order of execution of features and user stories, as in step 408.

In one or more embodiments, the step of determining potential spillovers of user stories and the risk comprises calculation of total capacity and load for each team and sprint combination. There may be spillover of user stories if the load for the team is more the capacity as they cannot complete the assigned task in time which leads to left over user stories without completion which is termed as spillover user stories. There may be risks when the team is allocated with stories more than its capacity, if one team is allocated with more stories and other teams doesn't which results in bottleneck situations. The risks may be a features related risks, stories dependencies risks, team capacity related risks and/or team bottleneck risks which are described in detail in relation to FIG. 5. The intention of the technology in the present disclosure is to reduce/eliminate such spillovers and risks through simulated planning before the actual allocation to teams. Also, the total effort for each team and sprint combination may be calculated and issues if any may be highlighted in effort allocation based on threshold levels of the teams over spare capacity available with the teams. If there are no spillovers of user stories and risks identified by the load balancing module as in step 408, the final release plan 212 may be generated by the system and displayed to the user so that user can execute the plan generated by the system which may be of low risk for project completion. If spillovers of user stories and risks are identified by the load balancing module 208, one or more instructions may be sent to the risk assessment module 210 along with the identified risks and spillovers information. The load balancing module 208 may be configured to determine risks and spillovers based on set of pre-defined rules and user configured algorithms which may execute simulation to determine improper allocations for teams and improper sequence of feature execution which may lead to spillovers and invalid dependencies, which further may lead to incompletion of release backlog within the stipulated time.

Figure 5:
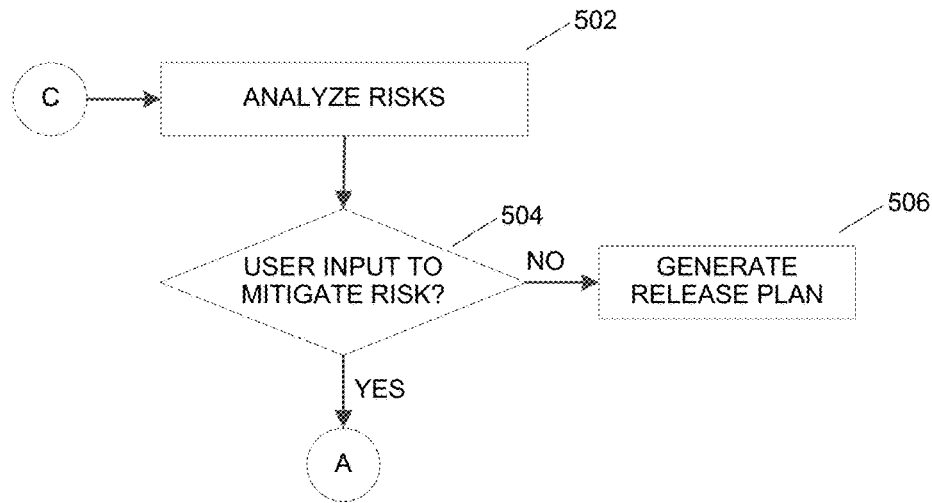
FIG. 5 is a process flow diagram, illustrating steps performed by the risk assessment module of the automated simulation engine, according to one or more embodiments.

Referring to FIG. 5 which is a process flow diagram illustrating steps performed by the risk assessment module 210, according to one or more embodiments. In one or more embodiments, the risk assessment module 210 may be configured to analyze the determine risks as in step 502 and help user to mitigate risks through simulation and generate a feasible release plan as per the requirement of the user. The risks may be such as, but not limited to, features related risks, stories dependencies risks, team capacity related risks and/or team bottleneck risks.

In one or more embodiments, feature related risks may be such risks where stories that are likely to spillover in the last sprint. Stories dependencies risks are such risks where invalid dependencies exists within a sprint i.e. the story to be completed earlier is probably scheduled for later based on various factors related to teams. Stories dependencies risks may also occur if dependency exists between stories of two different features. Team capacity related risks may be such risks where the teams have stories allocated beyond capacity. Team bottleneck related risks may be such risks where at least one team has maximum number of dependencies compared to other teams that are part of release and/or at least one team is assigned to deliver maximum features in the release. This is to ensure that all teams are assigned stories evenly. The automated simulation engine 200 (or load balancing module 208) may highlight the above-mentioned risks graphically using a graphics processing unit (GPU) on the computing device associated with the user. The user may choose to either proceed with the risks or may choose to mitigate the risk, as in step 504. If there is no input from user to mitigate the risks (possibly with an intension that the risks can be managed) the final release plan 212 may be generated as in step 506. A release plan may be a document which comprises information about allocation of user stories to teams and order of execution of user stories which may be used for teams as generated as described in various embodiments of the present disclosure. If the user intends to mitigate the risk identified by the system, the user may provide inputs (or confirmation) to the risk assessment module 208, then risk assessment module 210 may send instructions to sequencing module 206 to re-simulate the order of execution of user stories. The user may modify various parameters using the sequencing module 206 to perform re-simulation as described in FIG. 3.

Figure 4:
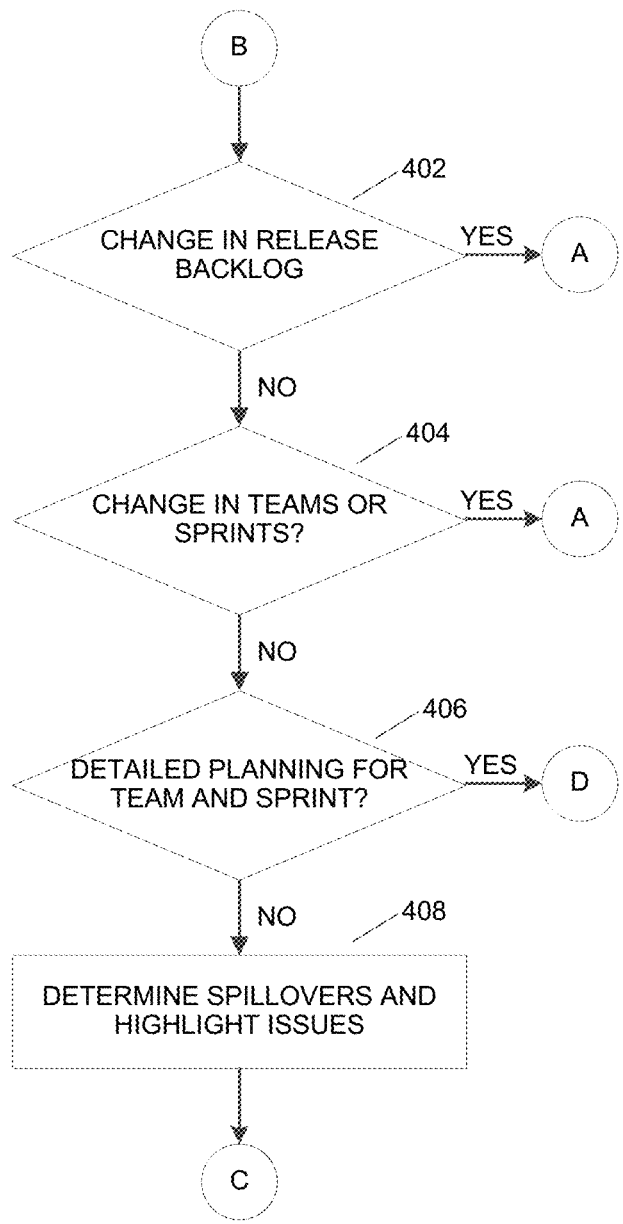
FIG. 4 is a process flow diagram, illustrating steps performed by the load balancing module of the automated simulation engine, according to one or more embodiments.
Figure 6:
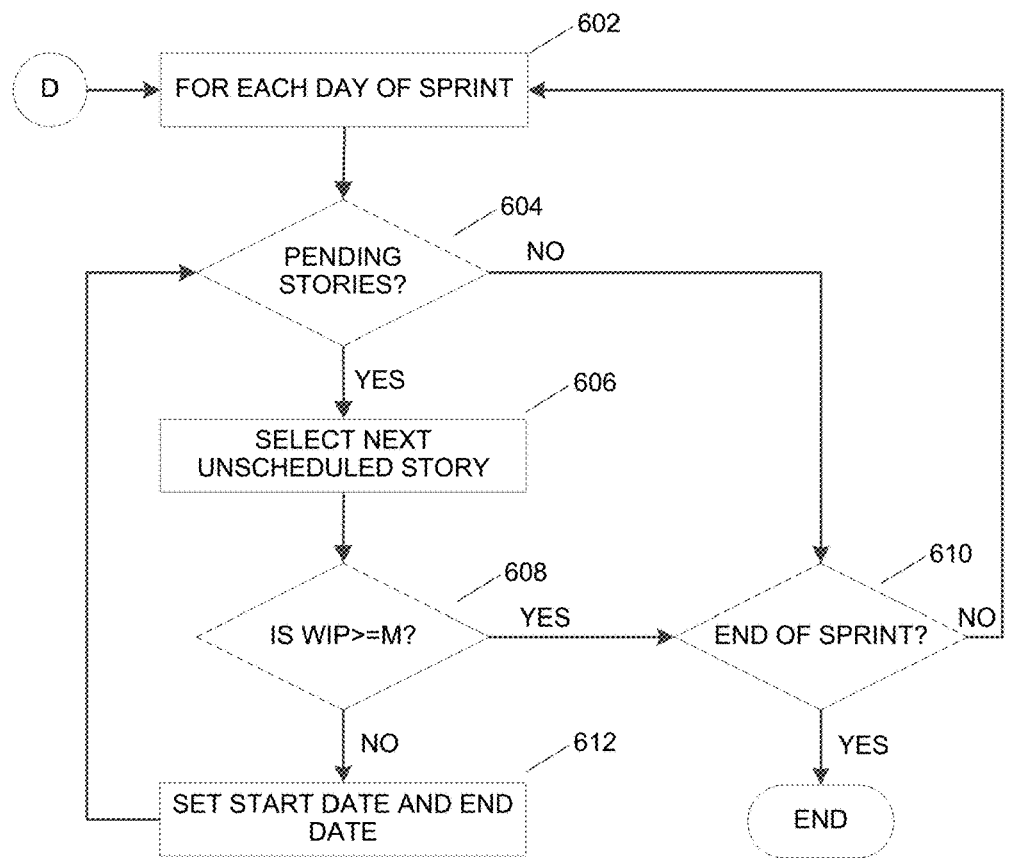
FIG. 6 is a process flow diagram, illustrating steps performed by the sprint planning module of the automated simulation engine, according to one or more embodiments.

Referring to FIG. 4, if a detailed planning is required for team and sprint as in step 406, the load balancing module 208 may send instructions to sprint planning module 214 of the sprint simulation engine 204. The sprint planning module 214 mentioned in FIG. 2 may be configured to perform steps as described in FIG. 6.

In one or more embodiments, sprint planning module 214 may be configured to receive one or more instructions from the load balancing module 208 to determine the optimal order of execution of user stories by simulating possible combinations of order of execution of user stories based on plurality of parameters. The sprint planning module 214 may receive sprint backlog and sprint data comprising velocity from the database 220. In one or more embodiments, the sprint planning module 214 may also be configured to process user stories based on request from the user as an independent module as well, without receiving instructions from load balancing module 208.

In one or more embodiments, after receiving the instructions and allocation information, the sprint planning module 214 determine whether the stories meet 'definition-of-ready' criteria comprising list of parameters which indicates whether the story is ready for execution or not. The list of parameters may be, but not limited to size of story (categorization whether story is small or large in terms of story points), intended objective parameter that indicates what functionality of the release backlog is being implemented as user stories etc. For example, size of user story may be large to an extent that the story cannot be delivered in a sprint with team's available capacity. Such stories are marked as 'not ready' to highlight risk in delivering sprint commitment. Now, referring to FIG. 6, the sprint planning module 214 may be configured to access the allocation information from the database 220 and for each day of the sprint in the allocation, a check may be performed as in step 602 to determine if there are no pending stories available in the release backlog as in step 604.

If no pending stories are available to be scheduled/sequenced, then the sprint information is checked whether the current date has surpassed the sprint date which means the sprint has come to an end or completed, as in step 610. If the current date is within the sprint date as per the check performed by the system at step 610 and no pending stories are available for that sprint as in step 604, the sprint planning module 214 is said to have completed processing of all the stories. If there are no pending stories as per step 604 and the sprint is not completed yet as per the step 610, the next day of the sprint (D) may be selected at step 602 for processing.

If there are pending stories as per the check performed at the step 604, the unscheduled story may be picked up for sequencing based on at least one of, but not limited to priority, story points and/or open dependencies, as in step 606. Open dependencies may be such dependency where a story is dependent on another story with a status 'Not Completed'. As per the condition checked at step 608, i.e. if 'work in progress' (WIP) is greater than or equal to 'M', wherein WIP represents number of scheduled stories for the team and 'M' represents number of developers in the team, and it is not 'end of sprint' as in step 610, another day of the same sprint may be selected for sequencing. If the work in progress is greater than the number of developers as per the check in 608 and is 'end of sprint' as in step 610 the sprint planning may come to end as further sequencing within sprint is no more possible. If the 'work in progress' is less than 'M', a start date and end date may be determined for the selected user story of the sprint as in step 612 as described below.

For example, consider there are 20 stories and the team comprise 10 (Ten) developers and 5 (Five) testers. In the first iteration of 608, there may be no stories in progress. So, WIP is '0' and 'M' is '10', hence the step 612 may be executed wherein the start date for the story may assigned/determined to be the first day of the sprint. The end date for the story may be determined by adding number of days to the start date based on the size of the story. The decimal round-off rule may be applied to the end date in case the size of story in terms of story points have decimal values. For example, if the story point of a story is 3.4, then end date may be determined to be the first half of the day of determined end date. The load of testers in the team may also be considered while determining the end date for the user stories in case of multi-tasking scenarios. For example, the tester may work on one story and by the time it is completed, another story may be in queue. The queue duration may also be considered to determine the end date for the user stories.

In an immediate next iteration of 608, the WIP may be '1' and 'M' is '10', hence as per the condition in 608, the start date and end date for the next chosen user story may be determined as described in the previous paragraph. This iteration at the step 608 may be continued till number of stories in progress (also referred as 'assigned stories') is equal to number of developers. When WIP is more than 'M', the iteration breaks as there can't be allocation of user stories beyond the capacity of the developers in a team for that day 'D' of the sprint. If the sprint is not end as per the check in step 610, next day of the sprint may be chosen i.e., D may be incremented by '1' and this iteration may continue till the end of the sprint.

The scheduled user stories may be presented to the user graphically which is described in subsequent paragraphs of the present disclosure. Further the user stories as per the schedule performed by the sprint planning module 214 may be communicated to the load balancing module 208 wherein the spillovers and risks are identified again. If further risk mitigations to be performed, the user may invoke the sprint planning module 214 to determine the revised schedule of user stories by updating the allocation information and team information.

In one or more embodiments, when the project team is in the mid of sprint cycle, there may be a need to revisit to check the completion status of the user stories. In such cases, where the need arises to adjust the stories or the teams, the re-planning module 216 may be invoked by the sprint simulation engine 204 to revise the order of execution of user stories by updating the start date end date, which is described in FIG. 7.

Figure 7:
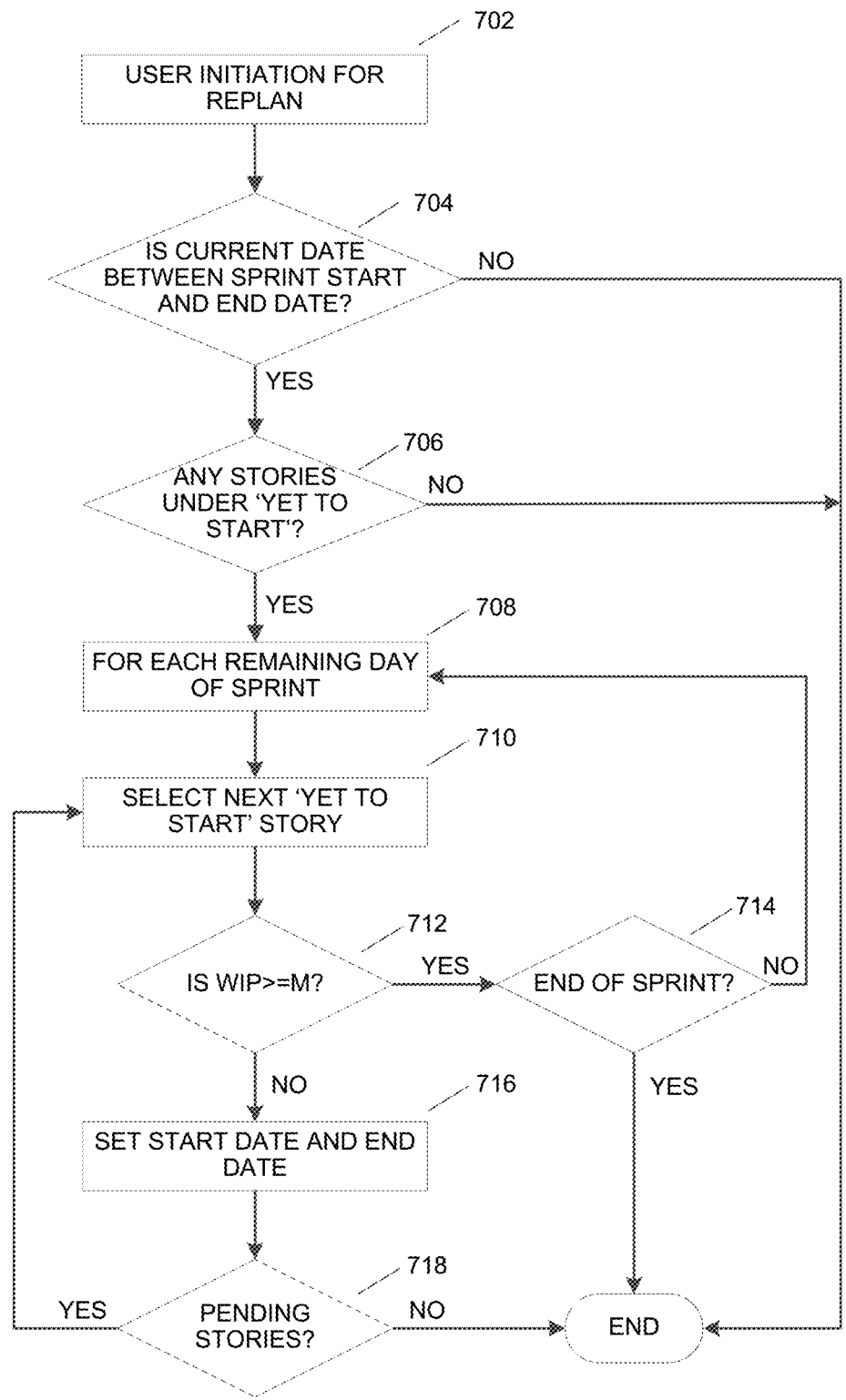
FIG. 7 is a process flow diagram, illustrating steps performed by the re-planning module of the automated simulation engine, according to one or more embodiments.

FIG. 7 is a process flow diagram illustrating the steps performed by the re-planning module 216, according to one or more embodiments. In one or more embodiments, the re-planning module 216 may be configured to perform re-planning of user stories in the mid of sprint duration i.e. any day between the start date of the sprint and a day before the last day of the sprint. This process may be initiated by the user and the sprint re-planning may be simulated by the re-planning module 216 as described in steps in FIG. 7.

In one or more embodiments, there may be possibility that stories assigned for the team is not complete or couldn't be picked up to work on it by team member for various reasons. In such case, to avoid 'completion time' crossing the stipulated date, there may arise a need to replan/reschedule allocation of the user stories. To simplify, partial completion or incompletion of user stories may result in spillovers and it needs to be mitigated. In such cases, the user may initiate re-plan of user stories using re-planning module 216, as in step 702. The condition with respect to the date whether current date on which the user is performing re-plan is within the sprint duration (i.e., the current date must be after the start date of the sprint and must be a day before the last day of the sprint) is checked as in step 704. If the condition as per 704 is 'yes' and if there are no stories with the status 'Yet to start' as per the check in step 706, it may mean that the story execution is going smooth as planned and no re-planning required.

If the condition as per 704 is 'yes' and if there are stories with the status 'Yet to start' as per the check in step 706, i.e. stories which are not yet picked up by the team because of various reasons (ex. absence or delay in completion previous story by the team member), then for each remaining day of the sprint as in step 708, a story from those stories with the status 'Yet to start' may be selected as in step 710. If work in progress (WIP) is more or equal to the number of developers ('M') as per the condition in step 712, the next day of the sprint may be selected for re-planning as in step 708. If work in progress (WIP) is less than the number of developers ('M') as per the condition in step 712, a start date and an end data for the user story may be determined. The start date may be the current date on which the replanning being performed by the user and the end date may be the date obtained by adding number of days to the current date based on story points of the user story under re-planning. The decimal round-off rule may be applied to the end date in case the size of story in terms of story points have decimal values. The load of testers in the team may also be considered while determining the end date for the user stories in case of multi-tasking scenarios. For example, the tester may work on one story and by the time it is completed, another story may be in queue. The queue duration may also be considered to determine the end date for user stories. If there are more stories under 'Yet to start' as per the check 718, the next story from those stories under the status 'Yet to start' may be selected for sequencing/planning. If there are no pending stories as per the check at step 718 the re-planning may be concluded, and the resultant sequence of user stories as per the simulation by the re-planning module 216 may be displayed graphically through graphics processing unit (GPU) at the computing device associated with the user for further action of the user. The further action may comprise implementation of resultant sequence of user stories by allocating the user stories to the teams for execution.

In one or more embodiments, the analytics and retrospective module 218 may be communicatively coupled to the sprint planning module 214 and may be configured to provide insights into sprint performance of teams by displaying various user customizable insights such as, but not limited to percentage completed trend over a sprint, story point size-to-completion relationship, start date-to-completion relationship, average days spent etc. based on historical data which help the teams to generate trend across sprints and across teams, identify cause and effect relationship between sprints and so on.

Figure 8:
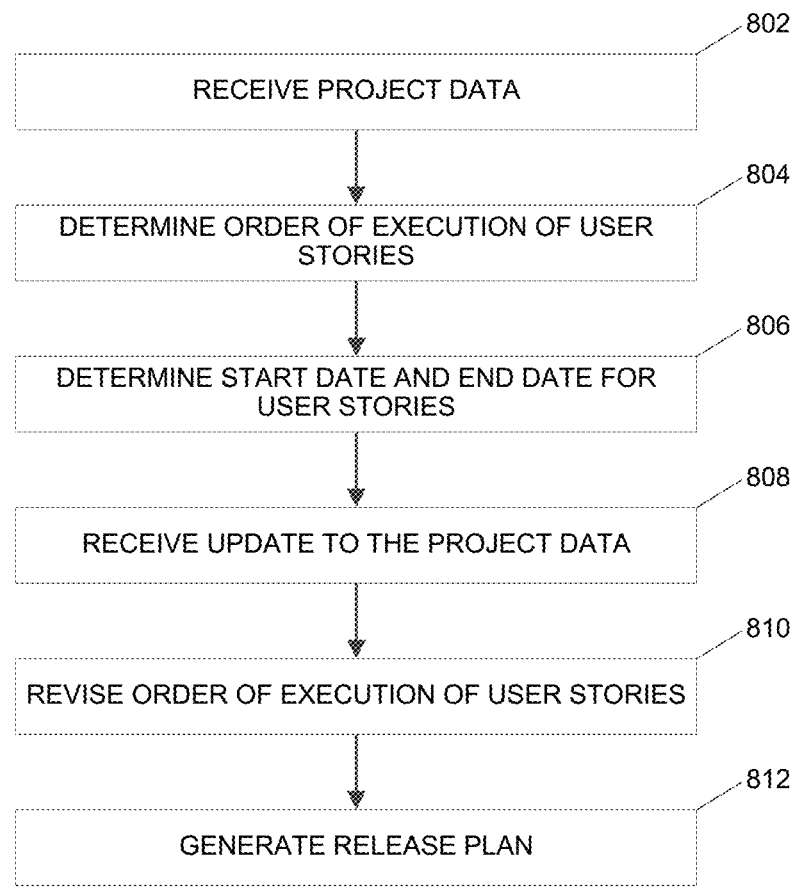
FIG. 8 is a process flow diagram, illustrating method performed by the automated simulation engine, according to one or more embodiments.

FIG. 8 is a process flow diagram, illustrating a method performed by the automated simulation engine, according to one or more embodiments.

In one or more embodiments, the method comprises receiving a project data at the automated simulation engine from a database 220 which comprises resource information and a set of features comprising user stories, as in step 802. The resource information may comprise information such as, but not limited to, count of number of available teams, composition of team such as developers and testers, team sprint wise capacity, velocity, number of sprints and/or information on level of planning. The set of features (also termed as release backlog) comprises one or more user stories (also referred as just 'stories') along with information such as, but not limited to priority level of features (High, Medium, and Low), story points of each of the user stories in the set of features and/or total story points for each features in the set of features. In an exemplary embodiment, Table 1 illustrates list of features selected for a release referred as release backlog, wherein Feature ID may be a unique ID by which feature is identified. Story points indicate the overall effort required to fully implement the user story and total story points may indicate total effort required to fully implement all the user stories under a feature.

TABLE 1

List of features considered for the release

| Feature ID | Priority | User stories <User ID> (<size in story points>) | Total Story Points |
|---|---|---|---|
| PMCO-101 | High | PMCO-102(13), PMCO-107(8), PMCO-110(8), PMCO-111(8), PMCO-112(8), PMCO-116(5), PMCO-109(8), PMCO-104(8), PMCO-108(8), PMCO-113(13), PMCO-15(13), PMCO-114(5), PMCO-105(8), PMCO-106(8), PMCO-103(8) | 129 |
| PMCO-39 | Medium | PMCO-42(8), PMCO-44(13), PMCO-46(5), PMCO-48(5), PMCO-41(5), PMCO-50(5), PMCO-45(5), PMCO-43(8), PMCO-40(13), PMCO-47(5), PMCO-49(5) | 77 |
| PMCO-51 | High | PMCO-58(8), PMCO-53(8), PMCO-52(5), PMCO-55(8), PMCO-56(8), PMCO-57(8), PMCO-54(8) | 53 |
| PMCO-59 | High | PMCO-73(8), PMCO-61(13), PMCO-67(5), PMCO-62(5), PMCO-74(8), PMCO-68(8), PMCO-69(8), PMCO-70(8), PMCO-63(5), PMCO-60(13), PMCO-66(5), PMCO-64(5), PMCO-65(5), PMCO-71(8), PMCO-72(8) | 112 |
| PMCO-75 | High | PMCO-83(13), PMCO-78(8), PMCO-79(8), PMCO-80(13), PMCO-76(8), PMCO-85(13), PMCO-82(13), PMCO-81(5), PMCO-77(8), PMCO-84(13) | 102 |
| PMCO-86 | Medium | PMCO-90(5), PMCO-92(5), PMCO-96(5), PMCO-97(5), PMCO-98(8), PMCO-87(13), PMCO-88(5), PMCO-99(8), PMCO-91(8), PMCO-100(8), PMCO-89(5), PMCO-93(5), PMCO-94(5), PMCO-95(5) | 90 |

An order of execution of user stories across plurality of sprints may be determined dynamically using sequencing module, as in step 804. In one or more embodiments, the steps for determining order of execution of user stories may comprise identifying priority of completion of user stories, dependencies between the user stories within each sprint of the plurality of sprints and teams, and dependencies between the user stories across the plurality of sprints and teams.

In one or more embodiments, sequencing module may be configured to allocate one or more stories to sprints by executing steps described in FIG. 3 and related paragraphs in the present disclosure. First the release backlog may be checked if it contains features which is a collection of user stories that together provide a functionality to end users. The release may also include plurality of independent stories. Wherever the release backlog contains features, sequencing module may automatically prioritize execution/completion of all the stories based on the identified priorities and dependencies within the feature or across feature so that end-to-end functionality offered from that feature is planned as a unit to avoid partial completion of stories within a particular feature.

As mentioned in the Table 1, the release backlog named 'Release 1' (for example) may comprise 6 features. Each of the features may contains stories as indicated in Table 1 with their story points and priorities. The release backlog may also contain independent stories with size in story points and priorities. When the release backlog is provided as input to the sequencing module, the stories maybe allocated as discussed in embodiments of the sequencing module in the present disclosure.

Stories under feature with highest priority may be scheduled first. Stories under feature PMCO-51, PMCO-59, PMCO-75 and PMCO-101 may be scheduled early than stories under PMCO-39 and PMCO-86 based on the priority assigned from product management team.

When there are features with same priority, features that have smallest size may be scheduled earlier, since the chances of completing these features is higher than that of bigger features. In the present example embodiment, features may be scheduled in the increasing order of size within the same priority, viz., PMCO-51, PMCO-75, PMCO-59, PMCO-101.

Once the sequencing/scheduling of feature is complete, independent stories in the order of priority and size may be picked up by the sequencing module for sequencing. In the above sequencing process, dependency of stories on other stories may be considered so that other dependent stories (within or outside of the feature) are scheduled before the stories that need these dependencies are scheduled. In the present example embodiment, the story PMCO-58 under feature PMCO-51 (a high priority feature) needs story PMCO-60 under feature PMCO-59.

The sequencing module may also consider number of dependent stories on a story i.e., the story with large number of dependent stories may be scheduled prior to another story which has a smaller number of dependent stories. In the present example embodiment, PMCO-117 and PMCO-121 are 2 stories with same priority and story point size. However, PMCO-46 and PMCO-120 are dependent on PMCO-117 and only PMCO-120 is dependent on PMCO-121. So, PMCO-117 may be scheduled earlier than PMCO-121.

Figure 9:
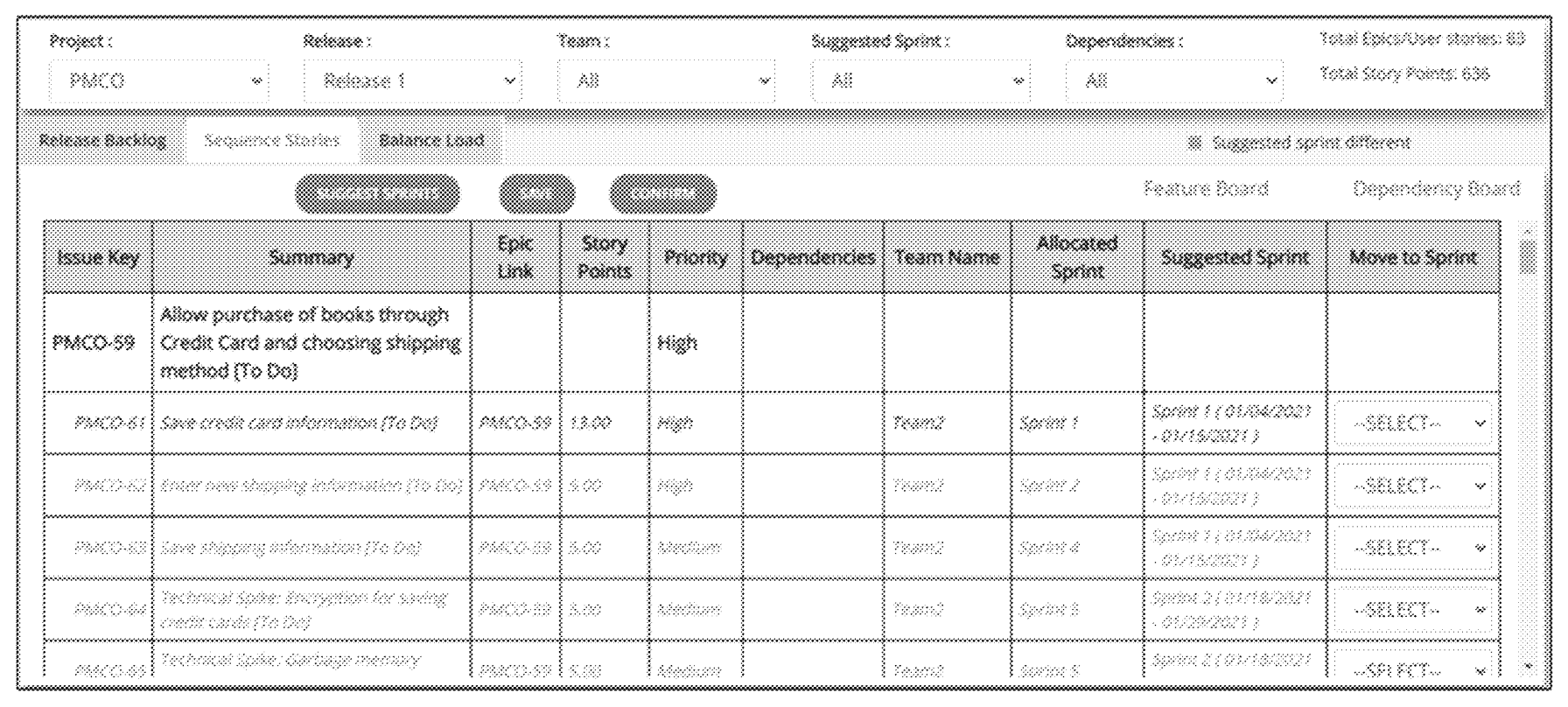

The sequencing module may also consider the velocity of teams in each of the sprint to sequence stories to the next suggested sprints of the release along with a condition that the total capacity of the program team across teams for a sprint is also not exceeded. The status of the stories may also be considered in sequencing i.e. stories that are having status other than 'yet to start' status may be ignored for release planning. FIG. 9 illustrates a snapshot of the output of sequencing module based on the data set present in Table 1.

Figure 10:
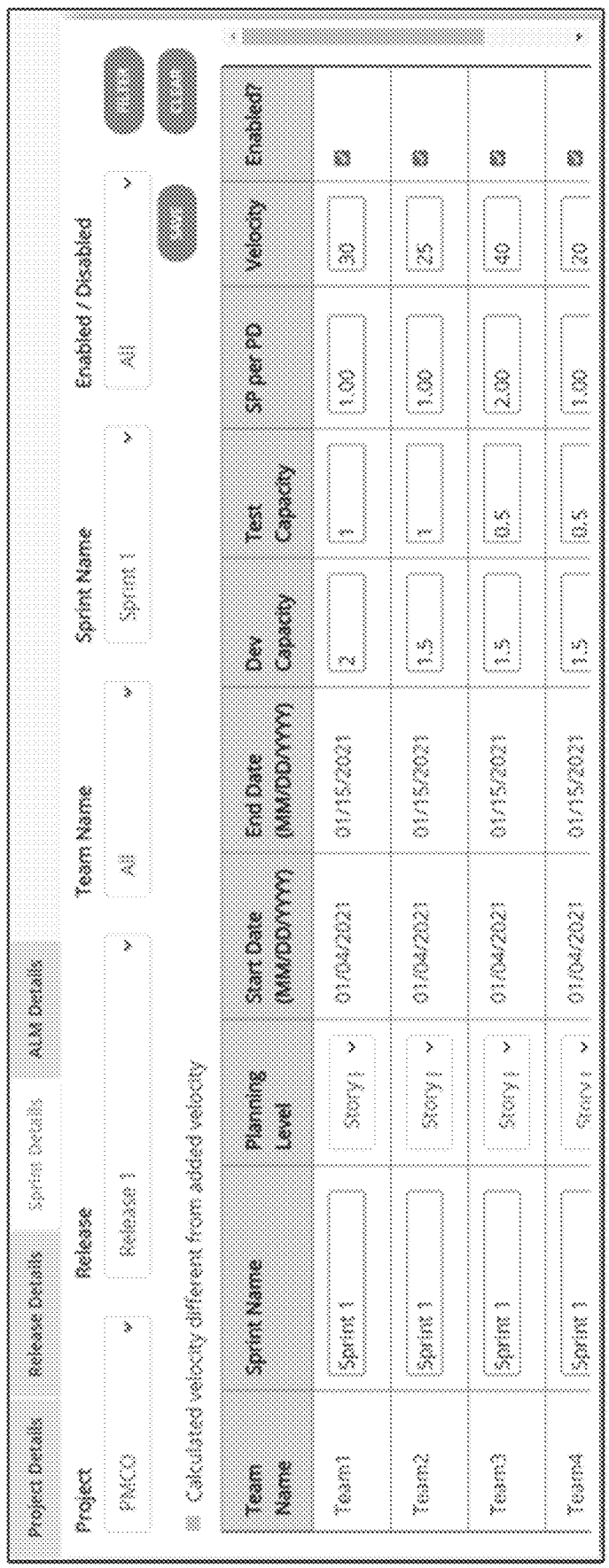
FIG. 10 is a snapshot, illustrating data transformed by the load balancing module of the automated simulation engine, according to one or more embodiments.

The output from the sequencing module may be communicated to the load balancing module. The load balancing module may then calculate an acceptable load and potential spillover of stories for each team and/or sprint combination to identify potential spillovers and risks for stories while considering the level of detail (Detailed level v/s Feature level) planning identified for each team and/or sprint combination and available capacity of the teams. In the present example embodiment, the release comprises 5 sprints and Sprint-1 planning level may be set as detailed planning, whereas for Sprint-2, Sprint-3, Sprint-4 and Sprint-5, the level of planning may be set as Feature level. The output received form the sequencing module may be transformed by the load balancing module as illustrated in FIG. 10.

In one or more embodiments, the user may set up the level of planning as either feature level or detailed level based on whether detailed planning is required for a sprint or not. For example, one of the parameters to decide on detailed level planning or feature level planning is the level of detail available for stories in a sprint backlog ex: size of stories. Also, the user may choose between detailed level planning and feature level planning based on whether the stories in the sprint are detailed as defined by 'Definition of Ready' (DoR)

for a project team. When the story meets 'DoR' then the detailed planning is advisable.

The load balancing module may now perform detailed level planning for the Sprint-1 by invoking sprint planning module wherein for each of the story, a start date and end date within the sprint duration may be determined based on the number of developers and testers available in the team, as in step 806. The load balancing module may invoke the sprint planning module to determine the start date and end date for user stories as described in various embodiments of the present disclosure. The start date for the user stories may be determined based on at least one of, but not limited to number of work-in-progress stories, team size, the identified priority, and/or dependencies. The end date may be determined based on the start date of the user stories and the size of the user stories measure in story points.

Figure 11:
FIG. 11 is a snapshot, illustrating output generated by the load balancing module of the automated simulation engine, according to one or more embodiments.

In one or more embodiments, the sequencing module may be configured to determined possible allocation of user stories to plurality of sprints and teams and determining order of execution of user stories across plurality of sprints and teams. The maximum work in progress at any time in the sprint may be dependent on number of developers available in the team. The duration of the user stories may be determined based on productivity (story points per person day of effort) and elapsed time—by considering the wait time due to multi-tasking of resources (testers) depending on the number of such resources with the number of stories that are with the status 'work-in-progress'. The stories may be selected in the order of priority, size, and dependencies to ensure independent stories are done prior to the start of dependent stories within the sprint. The detailed level planning (i.e., sprint level planning) ensures identification of stories that can be completed within the sprint and stories that are likely to spillover. The output of the load balancing module is illustrated in FIG. 11.

Figure 12:
FIG. 12 is a snapshot, illustrating output generated by the load balancing module of the automated simulation engine displaying the spillovers, according to one or more embodiments.

It is to be observed that the Sprint1—has spillovers identified due to detailed planning as per setup for Sprint-1 across all teams. In addition, because of manual override for developing some stories in a specific team/sprint (in some instances as user can update the data), there may be spillovers identified in other sprints as well. For example, Team-3 in Sprint-3 or Team-5 in Sprint-4 which may need attention from the users to balance the load across teams are highlighted by the load balancing module. The load balancing module may also identify and display the stories that are identified as spillovers as illustrated in FIG. 12.

Figure 13:
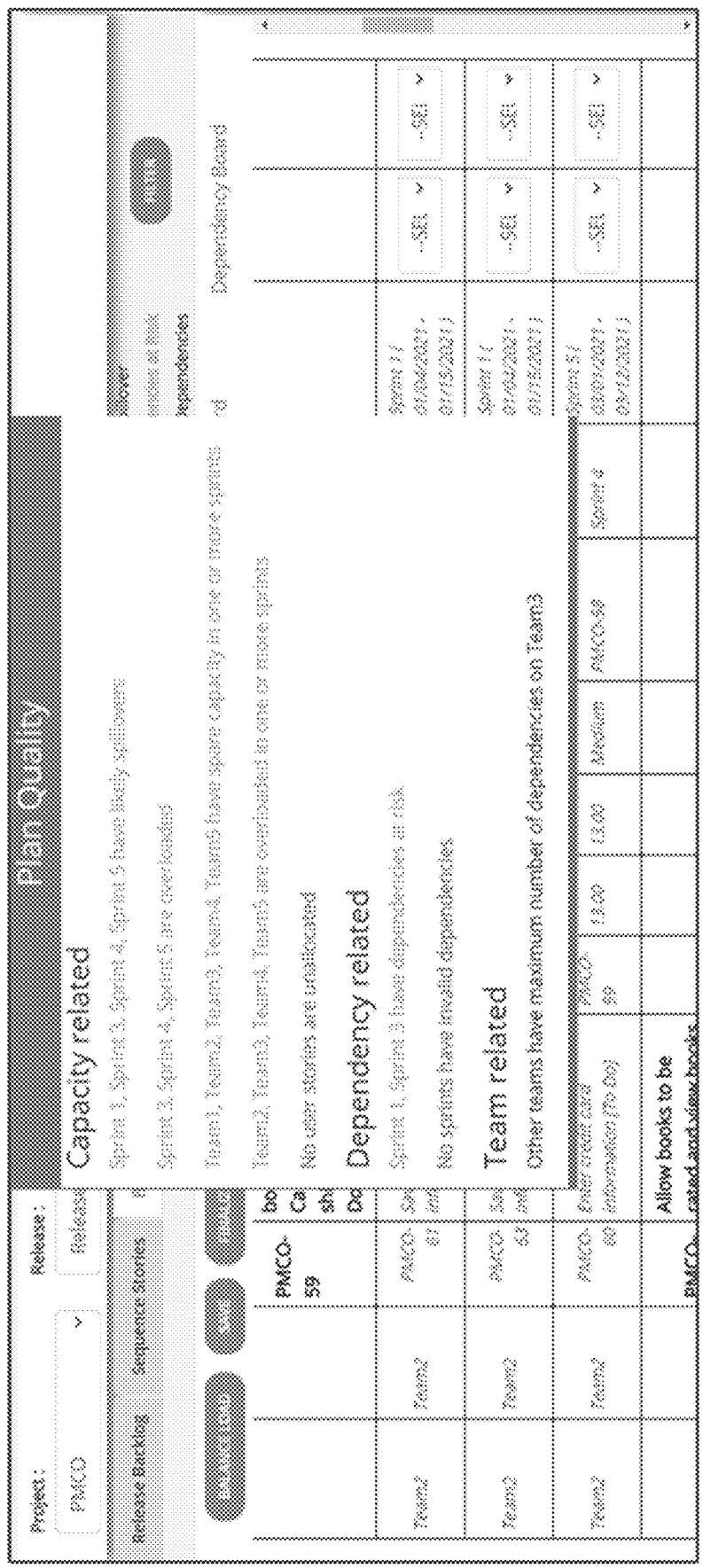
FIG. 13 is a snapshot, illustrating display of a descriptive information of the highlighted risk by the risk assessment module of the automated simulation engine, according to one or more embodiments.

The load balancing module may send the results to risk assessment module based on user input indicating that user intends to mitigate risks that are highlighted by the load balancing module. The risk in the order of execution of user stories is at least one of invalid dependencies, bottleneck teams, capacity constraints or potential spillover of user stories. The invalid dependencies are at least one or combination of invalid dependencies between teams and invalid dependencies between user stories. A dependency in the determined order of execution of user stories is said to be invalid if a current story cannot be completed as it would be dependent on another story which is scheduled later than the current story. The risk assessment module may display a descriptive information of the highlighted risks for the ease of user as illustrated in FIG. 13. As present in FIG. 13, there are capacity related risks in Sprint-1, Sprint-3, Sprint-4 and Sprint-5. Also, the teams have spare capacity in one or more sprints and there are dependency related risks in Sprint-1 and Sprint-3. There are no invalid dependencies and the release has maximum number of dependencies on Team-3 (bottleneck). A detailed view maybe provided by the risk assessment module as illustrated in FIG. 14 and FIG. 15.

Figure 14:
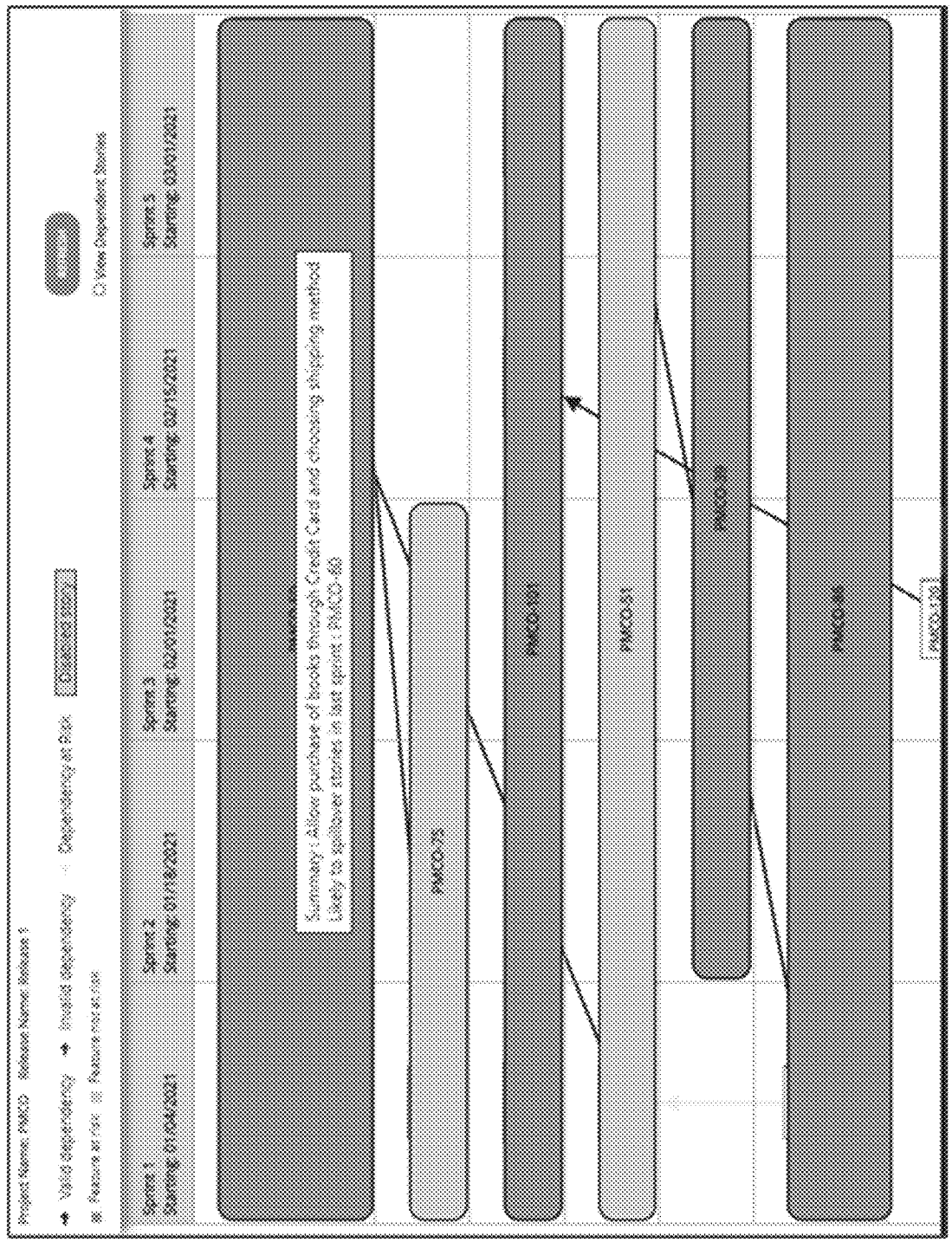
FIG. 14 is a snapshot, illustrating display of risk of spillovers by risk assessment module of the automated simulation engine, according to one or more embodiments.
Figure 15:
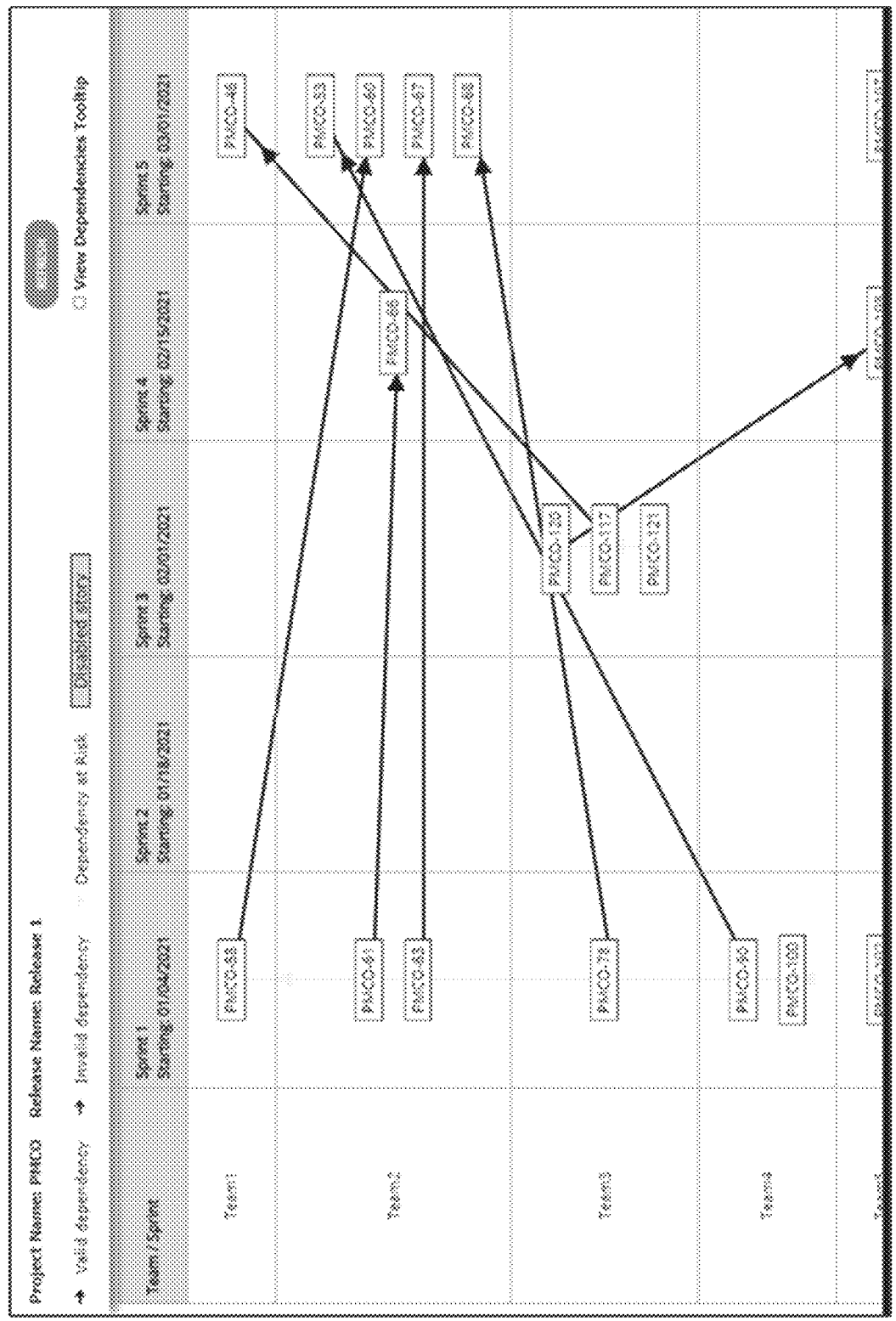
FIG. 15 is a snapshot, illustrating display of dependency risks by the risk assessment module of the automated simulation engine, according to one or more embodiments.

As illustrated in FIG. 14, the features at risk may be highlighted (preferably in red color in this example) and which story is at the risk of spillover may also be displayed. In the present example embodiment, PMCO-59 feature is at risk due to story PMCO-60 planned in the last sprint and is likely to spillover. In addition, dependency related risks may also be displayed by the risk assessment module as illustrated in FIG. 15. Stories PMCO-120, PMCO-117 and PMCO-121 are at risk due to same sprint dependencies within Team-3. Also, there are stories PMCO-58, PMCO-61 having same sprint dependencies across Team-1 and Team-2.

Figure 16:
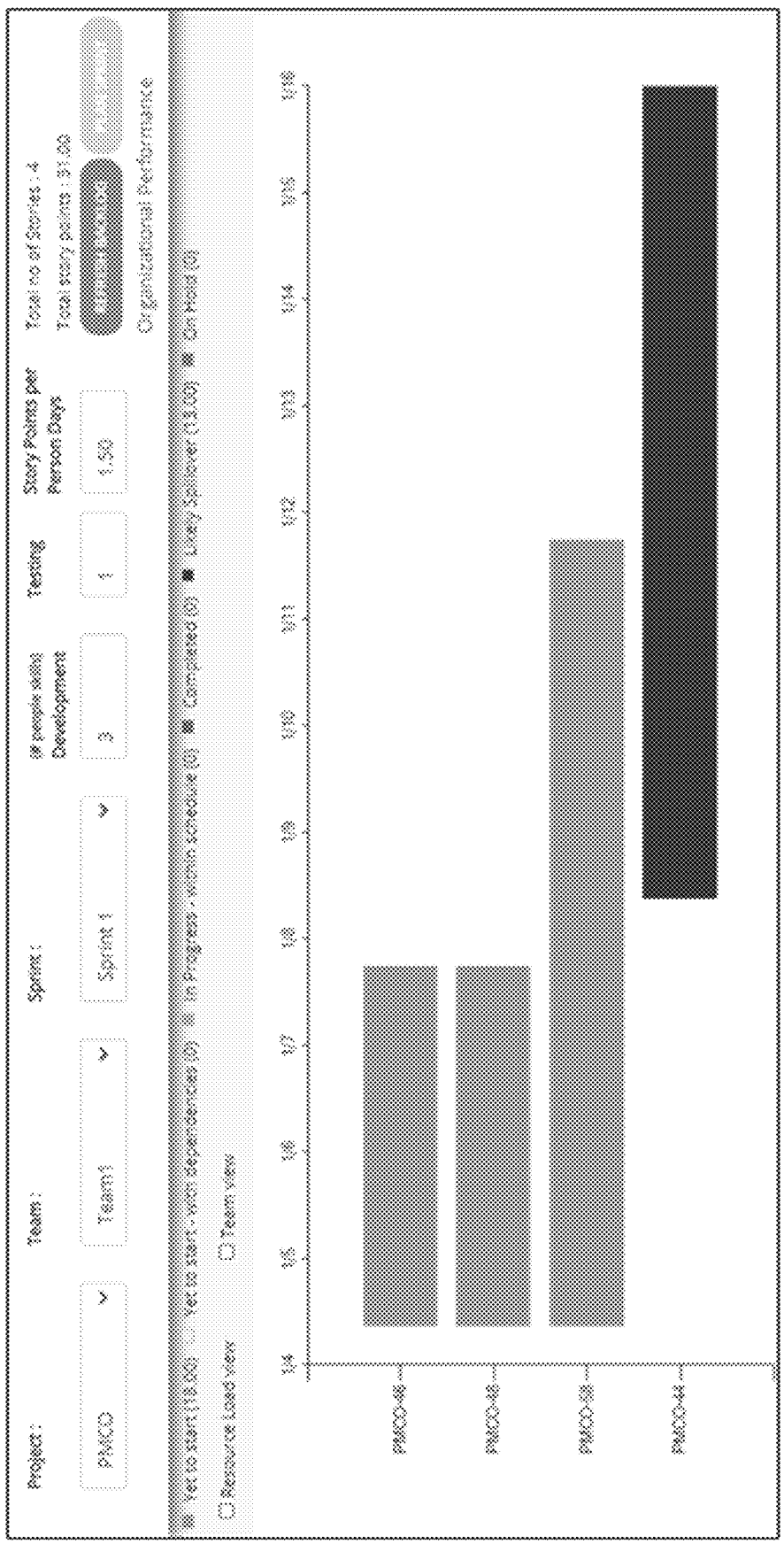
FIG. 16 is a snapshot, illustrating display of the sequence of user stories by highlighting the spillover by the sprint planning module of the automated simulation engine, according to one or more embodiments.

During the detailed level planning, sprint planning module may be configured to display the sequence of user stories by highlighting the spillover (preferably in red color in this example) as illustrated in FIG. 16, wherein PMCO-44 is likely to spillover in Team-1 in Sprint-1 which helps the user to take actions using the capabilities provided by the automated simulation engine as described in various embodiments of the present disclosure.

The determined order of execution of user stories may be displayed graphically by indicating potential spillover of user stories comprising one or more patterns of allocation of the user stories to the plurality of sprints and the risks involved in the determined order of execution and allocation of user stories. The potential spillover of user stories is said to be present if the determined order of execution of user stories surpasses the scheduled timeline. An update to the project data may be received from a user to resolve potential spillover of user stories to revise the order of execution of the user stores, as in step 808.

In one or more embodiments, one or more updates to project data may be received by the user as in step 808. The update to project data may be received by risk assessment module or the re-planning module, based on when the revised simulation is being executed. The risk assessment module may be configured to receive updates to project data at the beginning of the sprint to simulate various what-if scenarios before finalizing the release plan. If the user update to the project data at the risk assessment module, the sequencing module may be invoked to perform revised order of execution of user stories as described in various embodiments of the present disclosure, as in step 810.

The revised order of execution of user stories may be displayed graphically at the user device through a graphics processing unit comprising one or more patterns of allocation of the user stories to the plurality of sprints. The user may choose to either re-run the simulation or proceed with the revised order of execution of user stories as determined by the automated simulation method.

The revised order of execution of user stories may be used to generate a release plan, as in step 812. In one or more embodiments, the re-planning module may be configured to receive updated to project data in the mid of sprint duration. The steps executed by the re-planning module is described in various embodiments of the present disclosure.

In one or more embodiments, a non-transitory computer readable storage medium comprising machine executable code which when executed by at least one processor, causes the at least one processor to perform steps such as, receiving a project data from a database which comprises resource information and a set of features comprising user stories. An order of execution of user stories across plurality of sprints and teams may be determined dynamically based on the received project data.

The steps for determining order of execution of user stories may comprise identifying priority of completion of user stories, dependencies between the user stories within each sprint of the plurality of sprints and teams, and dependencies between the user stories across the plurality of sprints and teams. A start date for the user stories may be determined based on at least one of, but not limited to number of work-in-progress stories, team size, the identified priority, and/or dependencies. An end date may be determined based on the determined start date, and size of the user stories. The order of execution of user stories may be determined based on the determined start date and the end date for the user stories.

The determined order of execution of user stories comprising one or more patterns of allocation of the user stories to the plurality of sprints and teams may be displayed graphically along with the risks present in the determined order of execution and allocation of user stories. The risks may be at least one of invalid dependencies or potential spillover of user stories. The invalid dependencies may be at least one or combination of invalid dependencies between teams and invalid dependencies between user stories across teams. The potential spillover of user stories is said to be present if the determined order of execution of user stories surpasses the scheduled timeline. An update to the project data may be received from a user to resolve risks and to revise the order of execution of the user stores. The revised order of execution of user stories may be displayed graphically at the user device comprising one or more patterns of allocation of the user stories to the plurality of sprints and teams. The user may choose to either re-run the simulation or proceed with the revised order of execution of user stories as determined by the automated simulation method.

The technology described in the present disclosure is a simulation engine which may span across entire release and sprint lifecycle. The project team can simulate release plan in the run up-to the actual release planning process/event involving large distributed teams and prepare better for the planning events. The technology enables the actual release planning event with dispersed teams collaborate to arrive at robust release plan. The teams can visualize risk of upcoming sprints arising from lack of readiness of stories from 'Definition of Ready (DOR)' perspective. This help de-risk sprint performance even before sprint starts. The Scrum Master and team can use the automated simulation engine during 'Sprint Planning' to make informed decisions during Sprint Planning meeting. The team can have daily stand-up with automation engine as reference to guide decisions on what to do next. The scrum team can use automated simulation engine to have better quality input from teams (ensuring anonymity and pre-retro inputs) and arrive at action items leveraging collective experience and to track effectiveness of action items progress systematically. Teams will be able to view trend across sprints and learn from each other with view on which team is doing better on what agile parameter.

In one or more embodiments, the automated simulation engine may be a server and one or more users located at different geographical locations may access the automated simulation engine (or automated simulation server) using client computing machines through a computer network to perform the process described in various embodiments of the present disclosure. The communication between the automated simulation server and the client the automated simulation engine as a central server (may also be called as automated simulation server). In an enterprise environment, the automated simulation server (i.e., the automated simulation engine) and the client computing machines may be connected through a secured computer network. The processed data from the automated simulation server comprising determined order of execution or features and/or user stories, graphical display of risk assessment, generation of release plan and insights, and the various user inputs such as input to generate order of execution of features and/or user stories, revise the order of execution of features and/or user stories, input to mitigate risks, and/or confirmation on generation of release plan etc. may be communicated between the client computing devices and automated simulation server through the secured computer network. The technology described in the present disclosure is scalable and can generate the release plan in real-time, thus helping project teams to arrive at optimal de-risked plan and perform adjustments in plans in real-time, thereby enhancing effectiveness of overall release performance.

The specification and drawings in the present disclosure are to be regarded in an illustrative rather than a restrictive sense.

What is claimed is:

1. A computer implemented method for automated simulation of releases in an agile project environment, comprising:
   receiving, by a processor, a project data from a database, comprising resource information and a set of features comprising user stories;
   determining, by the processor, an order of execution of the user stories across a plurality of sprints, dynamically, based on the received project data, business priorities, size of user stories, and inter-dependencies of the user stories;
   displaying, by the processor, the determined order of execution of the user stories, graphically, by indicating risks present in the determined order of execution of the user stories, wherein the risks comprise invalid dependencies between a plurality of teams and between a plurality of user stories;
   receiving, by the processor, an update to the project data by a user to resolve the risks; and
   displaying, by the processor, a revised order of execution of the user stories, graphically, based on the updated project data.

2. The computer implemented method of claim 1, wherein the determining the order of execution of the user stories across the plurality of sprints further comprises:
   identifying, by the processor:
      priority of completion of the user stories,
      dependencies between the user stories within each sprint of the plurality of sprints, and
      dependencies between the user stories across the plurality of sprints;
   determining, by the processor, a start date and end date for the user stories; and
   determining, by the processor, the order of execution of the user stories based on the determined start date and end date.

3. The computer implemented method of claim 2, further comprising determining the start date for the user stories based on at least one of a number of work-in-progress stories, a team size, the identified priority, or dependencies.

4. The computer implemented method of claim 2, further comprising determining the end date based on the start date of the user stories and a size of the user stories.

5. The computer implemented method of claim 1, wherein the risks in the order of execution of the user stories further comprise a potential spillover of the user stories.

6. The computer implemented method of claim 5, further comprising:
- calculating, by the processor, total capacity, and load for each team and for each combination of sprints; and
- determining, by the processor, the potential spillovers of user stories based on the calculated total capacity and load.

7. The computer implemented method of claim 1, wherein the risks are a plurality of:
  (a) features related risks where stories are spilled over in the last sprint;
  (b) team capacity related risks where the teams have stories allocated beyond capacity; and
  (c) team bottleneck risks where at least one team has maximum number of dependencies compared to other teams that are part of release and at least one team is assigned to deliver maximum features in the release.

8. The computer implemented method of claim 1, wherein prior to determining the order of execution of the user stories, the method further comprises:
- determining, by the processor, whether the user stories meet 'definition-of-ready' criteria comprising list of parameters comprising one or more of a size of each user story and an intended objective parameter that indicates that a functionality of the release backlog is being implemented as user stories.

9. An automated simulation engine for releases in an agile project environment, comprising:
- at least one memory comprising programmed instructions stored thereon and one or more processors configured to be capable of executing the stored programmed instructions to:
- receive a project data, from a database, comprising resource information and a set of features comprising user stories;
- determine an order of execution of the user stories across a plurality of sprints based on the received project data, business priorities, size of user stories, and inter-dependencies of the user stories;
- allocate the user stories to the plurality of sprints based on the order of execution of the user stories across the plurality of sprints;
- determine risks in the order of execution of the user stories, wherein the risks comprise invalid dependencies between a plurality of teams and between a plurality of user stories;
- display the order of execution of the user stories, graphically, by indicating the determined risks present in the order of execution of the user stories;
- receive an update to project data from a user; and
- revise the order of execution of the user stories based on the update to the project data.

10. The automated simulation engine of claim 9, wherein the one or more processors are further configured to:
- identify priority of completion of the user stories;
- identify dependencies between the user stories within each sprint of the plurality of sprints;
- determine a start date and end date for the user stories; and
- determine the order of execution of the user stories based on the determined start date and end date.

11. The automated simulation engine of claim 10, wherein the start date for the user stories is determined based on at least one of a number of work-in-progress stories, a team size, the identified priority, or dependencies.

12. The automated simulation engine of claim 10, wherein the end date is determined based on the start date of the user stories and a size of the user stories.

13. The automated simulation engine of claim 9, wherein the risks in the order of execution of the user stories further comprise a potential spillover of the user stories.

14. A non-transitory computer readable medium having stored thereon instructions for automated simulation of releases in an agile project environment, comprising machine executable code which when executed by at least one processor, causes the at least one processor to perform steps comprising:
- receiving a project data, from a database, comprising resource information and a set of features comprising user stories;
- determining an order of execution of the user stories across a plurality of sprints, dynamically, based on the received project data, business priorities, size of user stories, and inter-dependencies of the user stories;
- displaying the determined order of execution of the user stories, graphically, by indicating risks present in the determined order of execution of the user stories, wherein the risks comprise invalid dependencies between a plurality of teams and between a plurality of user stories;
- receiving an update to the project data by a user to resolve the risks; and
- displaying a revised order of execution of the user stories, graphically, based on the updated project data.

15. The non-transitory computer readable medium of claim 14, wherein determining the order of execution of the user stories across the plurality of sprints comprises:
- identifying priority of completion of the user stories;
- identifying dependencies between the user stories within each sprint of the plurality of sprints;
- identifying dependencies between the user stories across the plurality of sprints;
- determining a start date and end date for the user stories; and
- determining the order of execution of the user stories based on the determined start date and end date.

16. The non-transitory computer readable medium of claim 15, wherein the start date for the user stories is determined based on at least one of a number of work-in-progress stories, a team size, the identified priority or dependencies.

17. The non-transitory computer readable medium of claim 15, wherein the end date is determined based on the start date of the user stories and a size of the user stories.

18. The non-transitory computer readable medium of claim 14, wherein the risks in the order of execution of the user stories further comprise a potential spillover of the user stories.

* * * * *